(12) United States Patent
Isomura et al.

(10) Patent No.: US 12,158,356 B2
(45) Date of Patent: *Dec. 3, 2024

(54) MANAGEMENT DEVICE, MANAGEMENT METHOD, AND MANAGEMENT PROGRAM

(71) Applicant: NIPPON TELEGRAPH AND TELEPHONE CORPORATION, Tokyo (JP)

(72) Inventors: Atsushi Isomura, Musashino (JP); Kazuhiro Miyahara, Musashino (JP); Ichibe Naito, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 123 days.

This patent is subject to a terminal disclaimer.

(21) Appl. No.: 17/908,534

(22) PCT Filed: Mar. 5, 2020

(86) PCT No.: PCT/JP2020/009540
§ 371 (c)(1),
(2) Date: Sep. 1, 2022

(87) PCT Pub. No.: WO2021/176677
PCT Pub. Date: Sep. 10, 2021

(65) Prior Publication Data
US 2023/0160719 A1    May 25, 2023

(51) Int. Cl.
*G01C 21/32* (2006.01)
*G01C 21/00* (2006.01)

(52) U.S. Cl.
CPC ......... *G01C 21/3867* (2020.08); *G01C 21/32* (2013.01); *G01C 21/3819* (2020.08)

(58) Field of Classification Search
CPC .............................. G01C 21/00; G01C 21/32
See application file for complete search history.

(56) References Cited

U.S. PATENT DOCUMENTS

| 9,274,525 B1 * | 3/2016 | Ferguson | B60W 10/18 |
| 10,296,795 B2 * | 5/2019 | Kwant | G05D 1/0246 |

(Continued)

FOREIGN PATENT DOCUMENTS

| JP | 2009-300889 A | 12/2009 | |
| JP | 2009300889 | * 12/2009 | G06F 17/30 |
| JP | 2015-1575 A | 1/2015 | |

OTHER PUBLICATIONS

Piórkowski, "Mysql spatial and postgis-implementations of spatial data standards", Electronic Journal of Polish Agricultural Universities, Available Online At: https://www.researchgate.net/profile/Adam_Piorkowski/publication/267627231_Mysql_spatial_and_postgis-implementations_of_spatial_data_standards/links/54547f7c0cf2bccc490b344d.pdf, vol. 14, Issue 1, Jan. 2011, 9 pages.

(Continued)

*Primary Examiner* — Anil K Bhargava
(74) *Attorney, Agent, or Firm* — XSENSUS LLP

(57) ABSTRACT

A management device includes processing circuitry configured to receive a plurality of inputs of road map data, refer to the road map data and generate a first polygon representing a lane region, generate, for a spatial mesh divided into a predetermined size, a second polygon representing a spatial index, and determine in which spatial mesh of a plurality of spatial meshes the first polygon exists, and in accordance with a result of the determination, and store data on the first polygon and data on the second polygon in a road coordinate database in association with each other.

11 Claims, 31 Drawing Sheets

(56) References Cited

U.S. PATENT DOCUMENTS

| | | | |
|---|---|---|---|
| 10,628,671 B2* | 4/2020 | Zang | G03B 15/006 |
| 11,222,527 B2* | 1/2022 | Young | G01C 21/3881 |
| 11,447,135 B2* | 9/2022 | Takamatsu | G08G 1/167 |
| 11,644,332 B2* | 5/2023 | Kitahama | G01C 21/3658 |
| | | | 701/533 |
| 11,861,841 B2* | 1/2024 | Mori | B60W 30/18163 |
| 11,954,812 B2* | 4/2024 | Miyahara | G06T 17/20 |
| 2013/0013202 A1* | 1/2013 | Som | G09B 29/106 |
| | | | 701/532 |
| 2017/0274898 A1* | 9/2017 | Nakamura | G06V 20/58 |
| 2017/0323028 A1* | 11/2017 | Jonker | G06F 16/9024 |
| 2018/0276483 A1* | 9/2018 | Zeng | G06T 7/521 |
| 2018/0373941 A1* | 12/2018 | Kwant | G08G 1/0145 |
| 2019/0031236 A1* | 1/2019 | Shiraishi | B62D 6/04 |
| 2019/0130182 A1* | 5/2019 | Zang | G06V 20/182 |
| 2020/0047768 A1* | 2/2020 | Hamada | B60W 50/029 |
| 2020/0064855 A1* | 2/2020 | Ji | G05D 1/0246 |
| 2020/0202593 A1* | 6/2020 | Black | G06T 11/206 |
| 2020/0380271 A1* | 12/2020 | Mittal | G05D 1/0088 |
| 2021/0058608 A1* | 2/2021 | Jung | H04N 13/271 |
| 2021/0163010 A1* | 6/2021 | Takabayashi | G08G 1/16 |
| 2021/0207973 A1* | 7/2021 | Kitahama | H04L 67/12 |
| 2021/0253107 A1* | 8/2021 | Takamatsu | B60W 30/18163 |
| 2021/0335056 A1* | 10/2021 | Brinig | G07B 15/02 |
| 2022/0009496 A1* | 1/2022 | Ueda | B60W 30/09 |
| 2023/0085455 A1* | 3/2023 | Mori | G06V 20/58 |
| | | | 382/104 |
| 2023/0162598 A1* | 5/2023 | Naito | G08G 1/017 |
| | | | 340/933 |
| 2024/0153281 A1* | 5/2024 | Zhou | G06V 20/588 |

OTHER PUBLICATIONS

"Introduction to PostGIS", PostGIS, Available Online At: http://postgis.net/workshops/postgis-intro/geometries.html, Retrieved from net on: Feb. 20, 2020, 11 pages.

* cited by examiner

Fig. 13

[FILE FORMAT EXAMPLE OF MESH INFORMATION]

139.75756672 35.68404090

139.87000100 35.69333500

139.45133901 35.57899556

··· (OMITTED) ···

139.66644555 35.77000007

139.98765432 35.11234506

CASE OF 15 DIGITS FOR LONGITUDE AND 14 DIGITS FOR LATITUDE
(1.25km × 1.25km)

(a)

CASE OF 18 DIGITS FOR LONGITUDE AND 17 DIGITS FOR LATITUDE
(150m × 150m)

(b)

1 MESH OF SPATIAL INDEX

CASE OF 15 DIGITS FOR LONGITUDE AND 14 DIGITS FOR LATITUDE
(1.25km × 1.25km)

▦ : NON-ROAD REGION
◯ : CAN BE GENERATED

MANAGEMENT DEVICE, MANAGEMENT METHOD, AND MANAGEMENT PROGRAM

CROSS-REFERENCE TO RELATED APPLICATION

The present application is based on PCT filing PCT/JP2020/009540, filed Mar. 5, 2020, the entire contents of which are incorporated herein by reference.

TECHNICAL FIELD

The present invention relates to a management device, a management method, and a management program.

BACKGROUND ART

In the related art, an inside/outside determination technique that determines whether certain coordinates are included within a certain polygon has been applied to a case where whether a polygon representing a road region includes geographic coordinates of a vehicle or the like is determined.

In the related art, a method has been proposed in which the center line of a road is set as the center and a polygon having a predetermined width from this center line is generated as a polygon representing a road region. Example of a method of managing the polygon generated in this manner includes storing all the polygons in the same table.

CITATION LIST

Non Patent Literature

NPL 1: "Mysql spatial and postgis-implementations of spatial data standards", [searched on Feb. 20, 2020], Internet <URL: researchgate.net/profile/Adam_Piorkowski/publication/267627231_Mysql_spatial_and_postgis-implementations_of_spatial data_standards/links/54547f7c0cf2bccc490b344d.pdf>

NPL 2: "Introduction to PostGIS", [searched on Feb. 20, 2020], Internet <URL: postgis.net/workshops/postgis-intro/geometries.html>

SUMMARY OF THE INVENTION

Technical Problem

In the above-described technique in the related art, because all the polygons are stored in the same table, it takes time to search all polygons to determine whether each of those polygons exists in the corresponding region.

The present invention has been made in view of the above, and an object thereof is to provide a management device, a management method, and a management program that perform polygon data management enabling high speed search.

Means for Solving the Problem

To solve the problems described above and achieve the object, a management device includes: processing circuitry configured to: receive a plurality of inputs of road map data; refer to the road map data and generate a first polygon representing a lane region; generate, for a spatial mesh divided into a predetermined size, a second polygon representing a spatial index; and determine in which spatial mesh of a plurality of spatial meshes the first polygon exists, and in accordance with a result of the determination, and stores data on the first polygon and data on the second polygon in a road coordinate database in association with each other.

A management method is a management method executed by a management device. The management method includes: receiving a plurality of inputs of road map data; referring to the road map data and generating a first polygon representing a region of a lane; generating, for a spatial mesh divided into a predetermined size, a second polygon representing a spatial index; and determining in which spatial mesh of a plurality of spatial meshes the first polygon exists, and in accordance with a result of the determining, and storing data on the first polygon and data on the second polygon in a road coordinate database in association with each other.

A non-transitory computer-readable recording medium stores therein a management program that causes a computer to execute a process including: receiving a plurality of inputs of road map data; referring to the road map data and generating a first polygon representing a lane region; generating, for a spatial mesh divided into a predetermined size, a second polygon representing a spatial index; and determining in which spatial mesh of a plurality of spatial meshes the first polygon exists, and in accordance with a result of the determining, and storing data on the first polygon and data on the second polygon in a road coordinate database in association with each other.

Effects of the Invention

In accordance with the present invention, data management of polygons can be performed to enable high speed search.

BRIEF DESCRIPTION OF DRAWINGS

FIG. 13 is a diagram illustrating an example of mesh information.

DESCRIPTION OF EMBODIMENTS

Hereinafter, embodiments of a management device, a management method, and a management program according to the present application will be described in detail with reference to the drawings. The present invention is not limited by the embodiment described below.

First Embodiment

First of all, a first embodiment will be described. A management device according to the present embodiment generates a lane polygon (first polygon) representing a lane region with reference to road map data, generates, for each spatial mesh divided into a predetermined size, a mesh polygon (second polygon) for representing a spatial index, determines in which spatial mesh the lane polygon exists, and in accordance with the result of the determination, stores data on the first polygon and data on the mesh polygon in a road coordinate database in association with each other.

Configuration of Communication System

Figure 1:
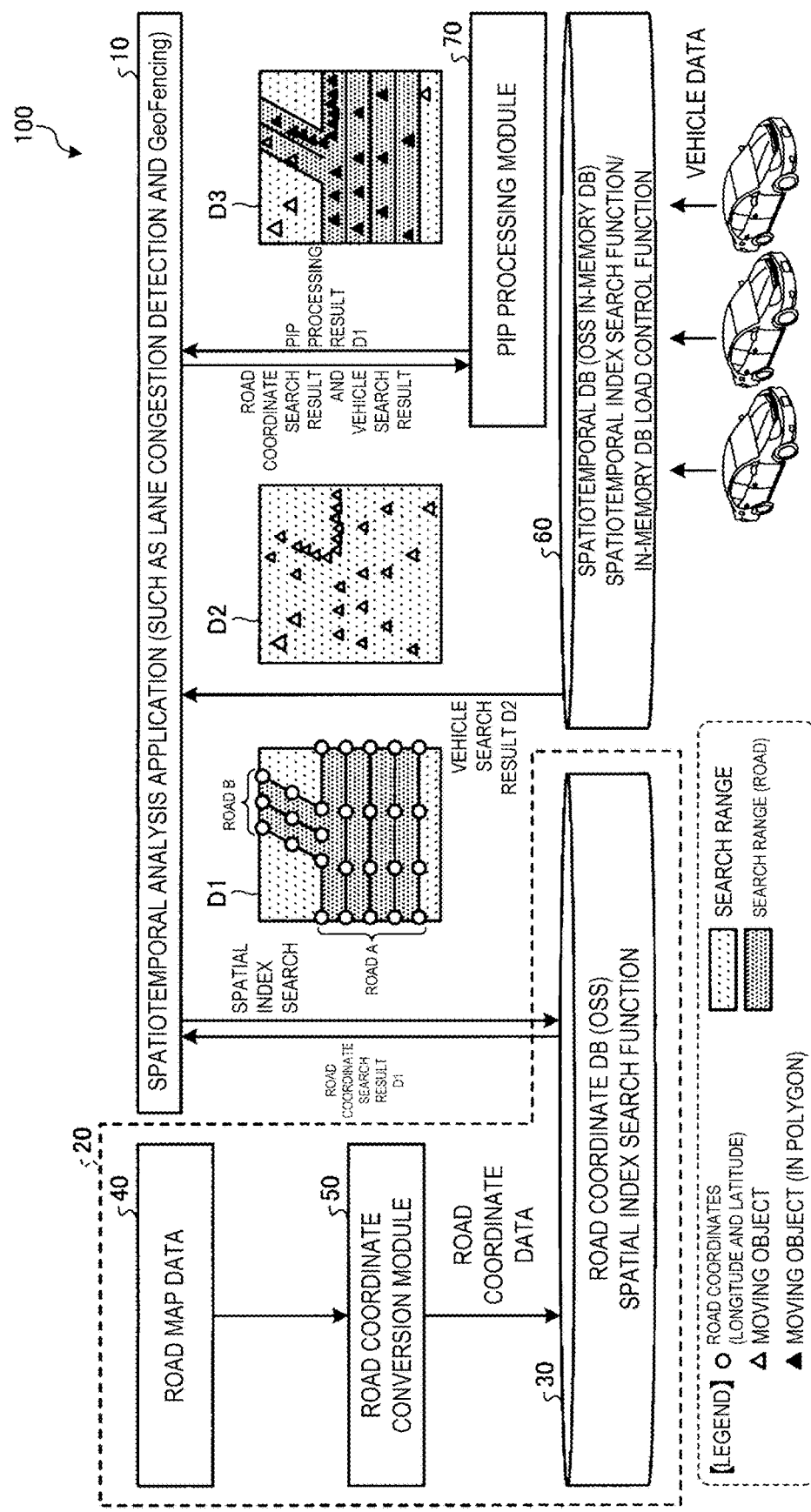
FIG. 1 is a block diagram illustrating an example of a configuration of a communication system according to a first embodiment.

FIG. 1 is a diagram illustrating one example of a configuration of a communication system according to the first embodiment. For example, as illustrated in FIG. 1, a communication system 100 in the first embodiment provides a PIP processing result D3 to a spatiotemporal analysis application 10, such as a lane congestion detection or GeoFencing, mounted on a terminal device (not illustrated). The PIP processing result D3 is a result of determining a position of a vehicle in each lane in a certain road.

In the communication system 100, in accordance with spatial index search performed by the spatiotemporal analysis application 10, a road coordinate database (DB) 30 (Open Source Software (OSS)) in a road coordinate management system 20 outputs a road coordinate search result D1 including the lane polygon representing the lane region. A spatiotemporal DB 60 that accumulates information regarding vehicle data outputs a vehicle search result D2 including the coordinates of the vehicle, to the spatiotemporal analysis application 10.

Then, upon receiving the road coordinate search result D1 and the vehicle search result D2 from the spatiotemporal analysis application 10, a PIP processing module 70 executes PIP processing to determine in which lane of the road the vehicle is positioned, and outputs the PIP processing result D3. The spatiotemporal analysis application 10 performs the lane congestion detection, GeoFencing, or the like based on this PIP processing result D3.

Road Coordinate Management System

Figure 2:
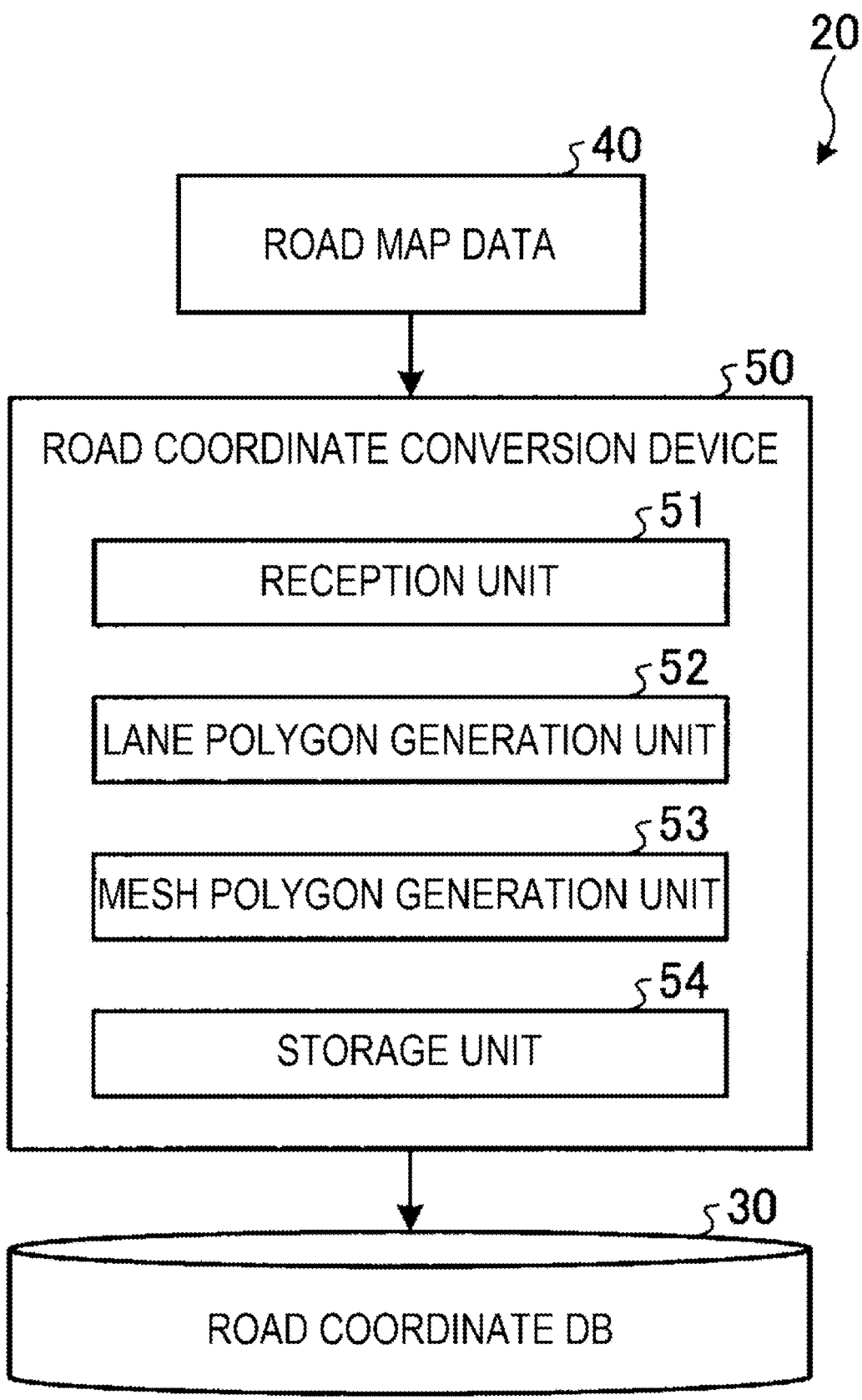
FIG. 2 is a diagram illustrating an example of a configuration of a road coordinate management system according to the first embodiment.

Next, the road coordinate management system 20 will be described. FIG. 2 is a diagram illustrating an example of a configuration of the road coordinate management system 20 illustrated in FIG. 1. As illustrated in FIG. 2, the road coordinate management system 20 includes a road coordinate conversion device 50 and a road coordinate DB 30.

The road coordinate conversion device 50 generates the lane polygon indicating the lane region using road map data 40 including longitude/latitude information on a road shoulder line and longitude/latitude information on a lane marker. The road coordinate conversion device 50 stores the generated lane polygon and a mesh polygon (second polygon) for representing a spatial index in the road coordinate DB 30 in association with each other. The lane polygon is data indicating the coordinates of each vertex of a polygon indicating the lane region. The mesh polygon is data indicating coordinates of each vertex of the spatial index with a polygon shape divided in accordance with a predetermined accuracy.

The road coordinate DB 30 stores the mesh polygon and the lane polygon in association with each other. The road coordinate DB 30 has a spatial index search function, searches for the lane polygon using the spatial index as a search key, and outputs the result of the search as the road coordinate search result D1.

Road Map Data

Next, the road map data 40 will be described. The road map data 40 stores data pieces including data on a road ID, a lane ID, the number of lanes, the longitude and the latitude of the road center, the longitude and the latitude of the lane center, and the longitude and the latitude of the lane marker (white lines indicating ends of the road and a dotted line). In the road map data 40, the longitude/latitude data is stored with attributes such as lane information, roadway information, lane marker, road shoulder line, intersection region, and road sign. The road coordinate conversion device 50 generates a polygon using lane information, roadway information, and longitude/latitude data of lane markers and road shoulder lines, among the data included in the road map data 40.

Road Coordinate Conversion Device

Next, referring back to FIG. 2, a configuration of the road coordinate conversion device 50 will be described. Note that the road coordinate conversion device 50 is, for example, implemented by a computer including a read only memory (ROM), a random access memory (RAM), a central processing unit (CPU), and the like reading a predetermined program and by the CPU executing the predetermined program. The road coordinate conversion device 50 has a communication interface that transmits and receives various pieces of information to and from another apparatus connected via a network or the like. For example, the road coordinate conversion device 50 includes a network interface card (NIC) or the like, and performs communication with another apparatus via a telecommunication line such as a local area network (LAN) or the Internet.

Figure 3:
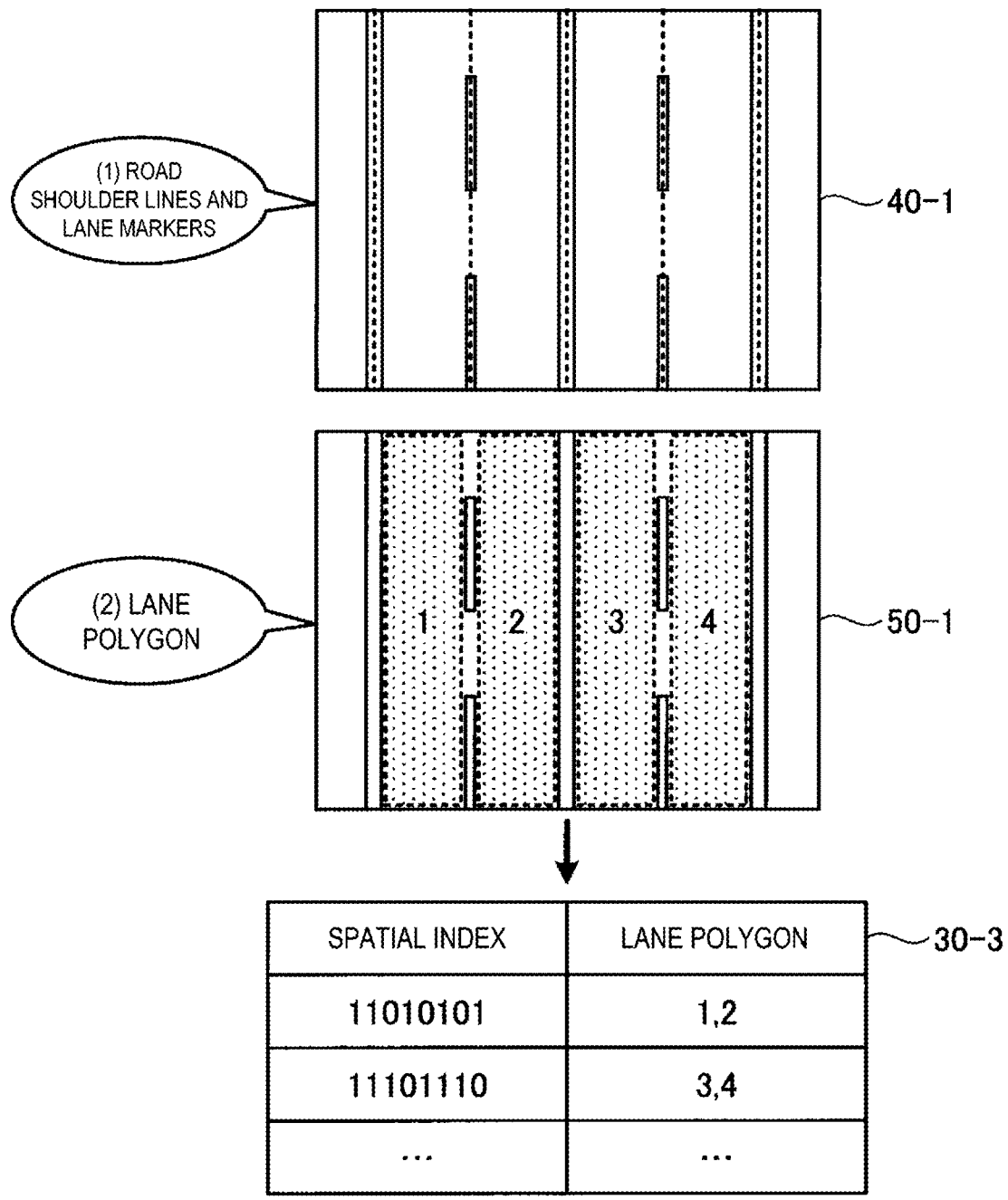
FIG. 3 is a diagram schematically illustrating processing executed by components of a road coordinate conversion device illustrated in FIG. 2.

As illustrated in FIG. 2, the road coordinate conversion device 50 includes a reception unit 51, a lane polygon generation unit 52 (first generation unit), a mesh polygon generation unit 53 (second generation unit), and a storage unit 54. FIG. 3 is a diagram schematically illustrating processing executed by the components of the road coordinate conversion device 50 illustrated in FIG. 2.

The reception unit 51 receives an input of the road map data 40. The road map data 40 includes latitude/longitude data 40-1 on the road shoulder line, the lane marker, and the like, as illustrated in FIG. 3 for example. For example, the reception unit 51 receives, as the road map data, the longitude/latitude data on the road shoulder line and the longitude/latitude data on the lane marker.

The lane polygon generation unit 52 refers to the road map data 40 to generate a lane polygon (see, for example, 50-1 in FIG. 3) indicating the region of the lane. For example, the lane polygon generation unit 52 refers to the road map data, and sets a region surrounded by a road shoulder line to a non-road region. Furthermore, the lane polygon generation unit 52 generates a lane polygon based on two adjacent non-road regions described above and data on the lane marker positioned between the two non-road regions.

The mesh polygon generation unit 53 generates, for each spatial mesh divided into a predetermined size, a mesh polygon representing a spatial index.

The storage unit 54 determines in which spatial mesh the lane polygon exists, and in accordance with the result of the determination, stores the data on the lane polygon and the data on the mesh polygon in the road coordinate DB 30 in association with each other. Specifically, the storage unit 54 stores, in the road coordinate DB 30, data (see, for example, 30-3 in FIG. 3) in which the data (spatial index) on the mesh polygon and the data on the lane polygon corresponding to the mesh polygon are associated with each other. For example, the storage unit 54 searches, for each spatial mesh, for each lane polygon included in each spatial mesh. Furthermore, the storage unit 54 stores in the road coordinate DB 30, the lane polygon thus searched for, and the mesh polygon corresponding to the spatial mesh including the lane polygon in association with each other.

In this manner, the road coordinate conversion device 50 performs polygon generation, by generating the lane polygon using a white line such as the road shoulder line and the lane marker, and then performing filtering using the spatial index.

The road coordinate conversion device 50 manages polygons by storing road polygons for each range separated by a spatial mesh (geohash). That is, the road coordinate conversion device 50 determines whether the polygon exists in a mesh separated by a spatial mesh, and then stores the polygons in the road coordinate DB 30 in association with the spatial mesh. With this configuration, when the spatial mesh to be searched is obtained in advance by calculation, the road coordinate conversion device 50 enables high speed search with many determinations omitted.

Figure 4:
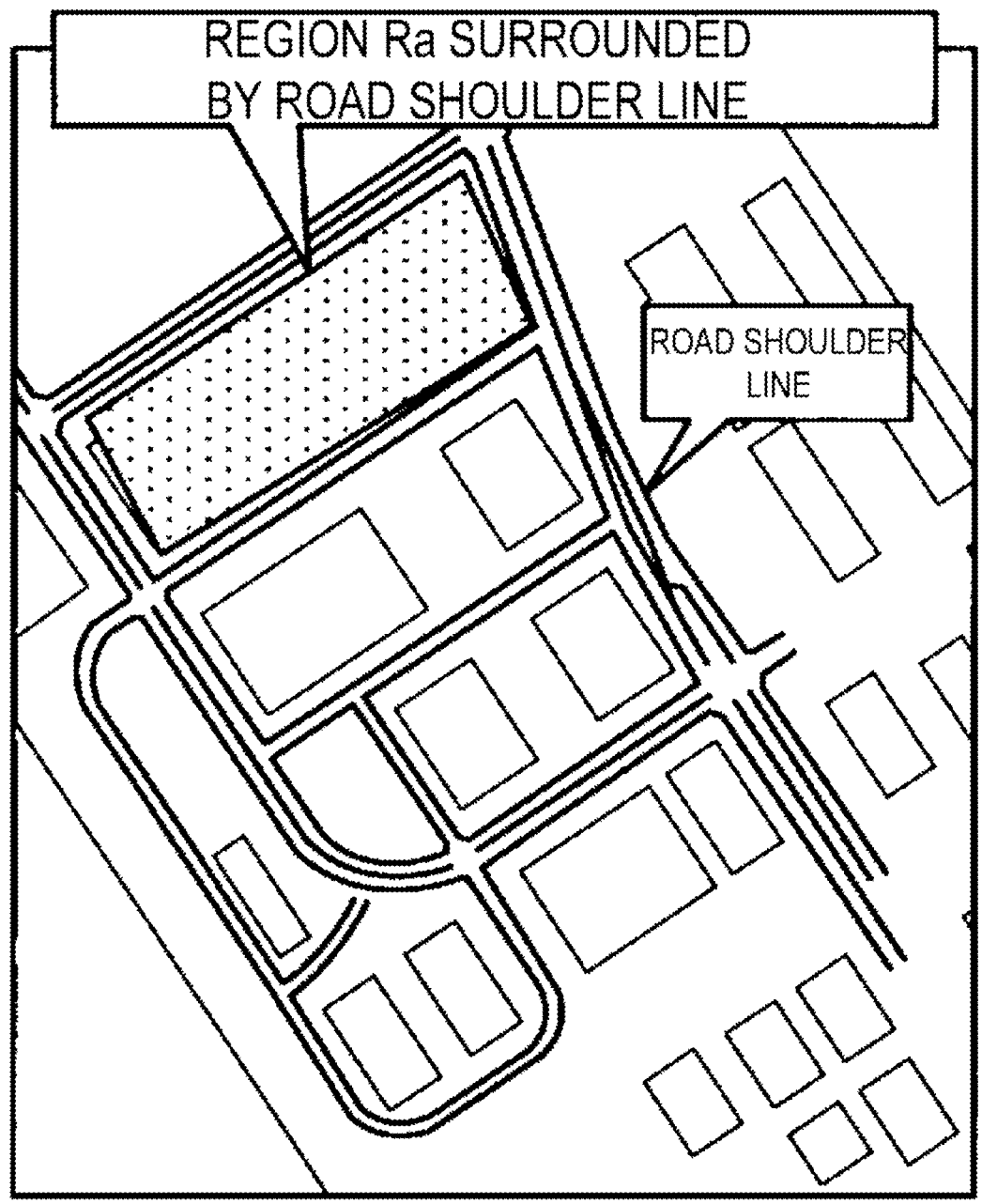
FIG. 4 is a diagram illustrating a definition of a non-road region.
Figure 5:
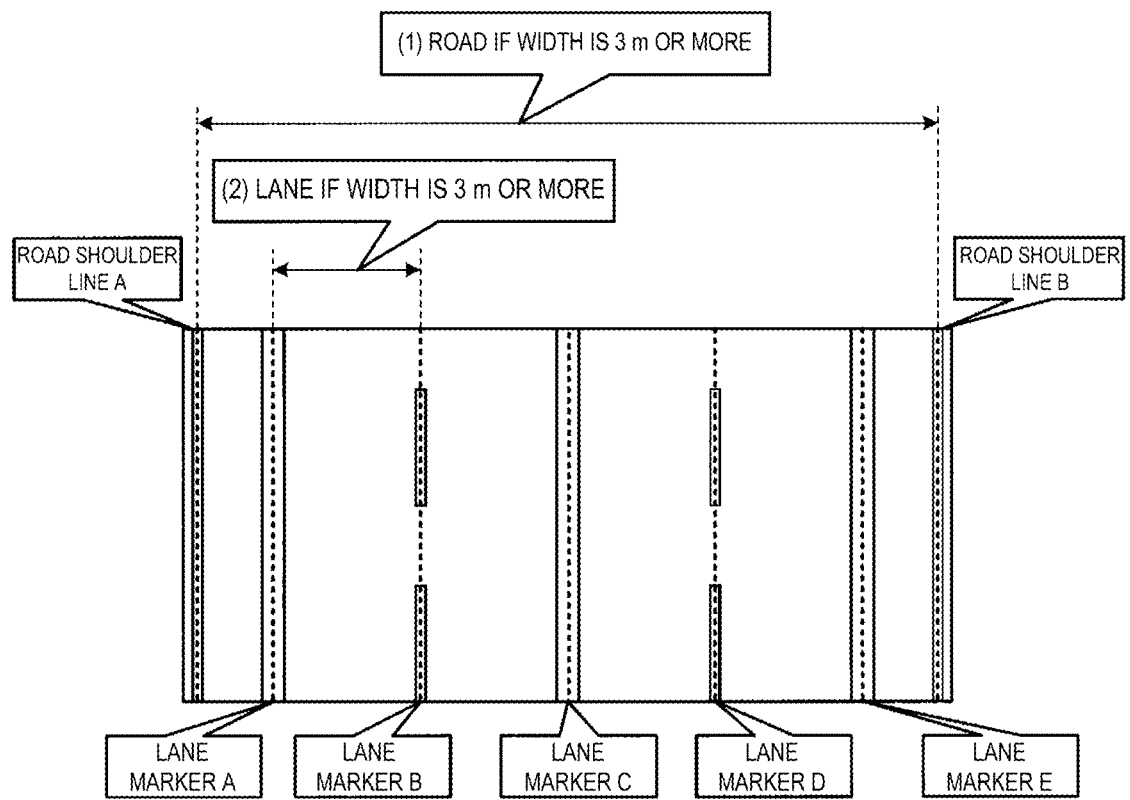
FIG. 5 is a diagram illustrating a definition of a road.

In the present embodiment, a "road" is defined as follows, and the lane polygon generation unit 52 determines the road and lane in accordance with the definition. FIG. 4 is a diagram illustrating a definition of a non-road region. FIG. 5 is a diagram illustrating a definition of a road.

First of all, a region surrounded by a road shoulder line is not a "road", and that is a "non-road region" (see, for example, Ra in FIG. 4). When the distance between a road shoulder line and a road shoulder line adjacent to the road shoulder line is equal to or longer than 3 m, the section between the road shoulder line and the road shoulder line adjacent to the road shoulder line is a "road". Specifically, when the distance between a road shoulder line A and a road shoulder line B is equal to or longer than 3 m, the section between the road shoulder line A and the road shoulder line B is a "road" (see (1) in FIG. 5). When the distance between a lane marker and a lane marker adjacent to the lane marker is equal to or longer than 3 m, the section between the lane marker and the lane marker adjacent thereto is a "lane". Specifically, when the distance between a lane marker A and a lane marker B is equal to or longer than 3 m, the section between the lane marker A and the lane marker B is a "lane" (see (2) in FIG. 5).

The road coordinate conversion device 50 sets the region surrounded by a road shoulder line to be a non-road region (see, for example, Ra in FIG. 4), for generating a lane polygon. Then, the road coordinate conversion device 50 generates a lane polygon based on two adjacent non-road regions and data on a lane marker positioned between the two non-road regions.

Flow of Processing Executed by Road Coordinate Conversion Device Now, a flow of processing executed by the road coordinate conversion device 50 will be described in detail. FIGS. 6 to 18 are diagrams illustrating a flow of the processing executed by the road coordinate conversion device 50 illustrated in FIG. 2.

Figure 6:
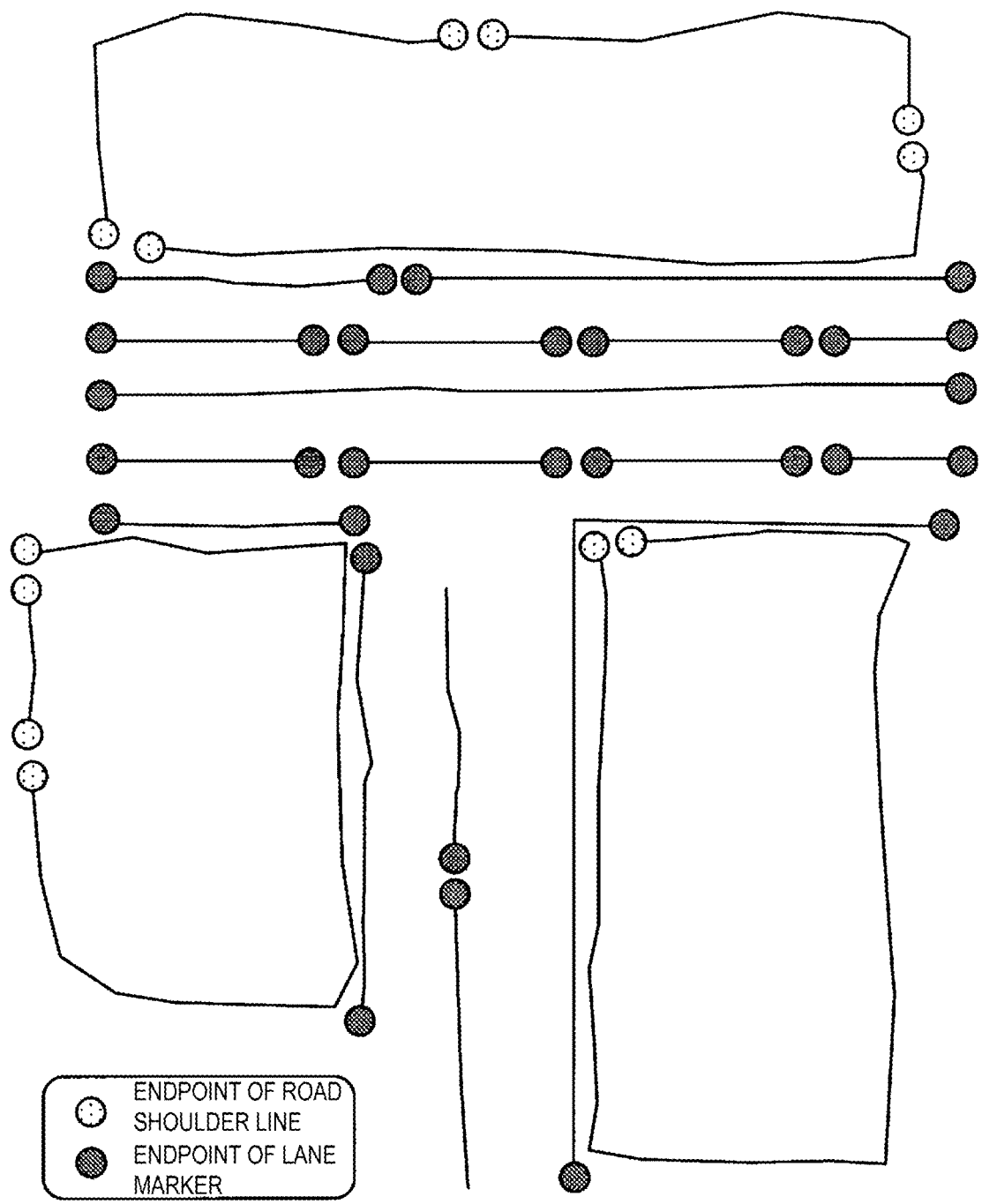
FIG. 6 is a diagram illustrating a flow of the processing executed by the road coordinate conversion device illustrated in FIG. 2.
Figure 7:
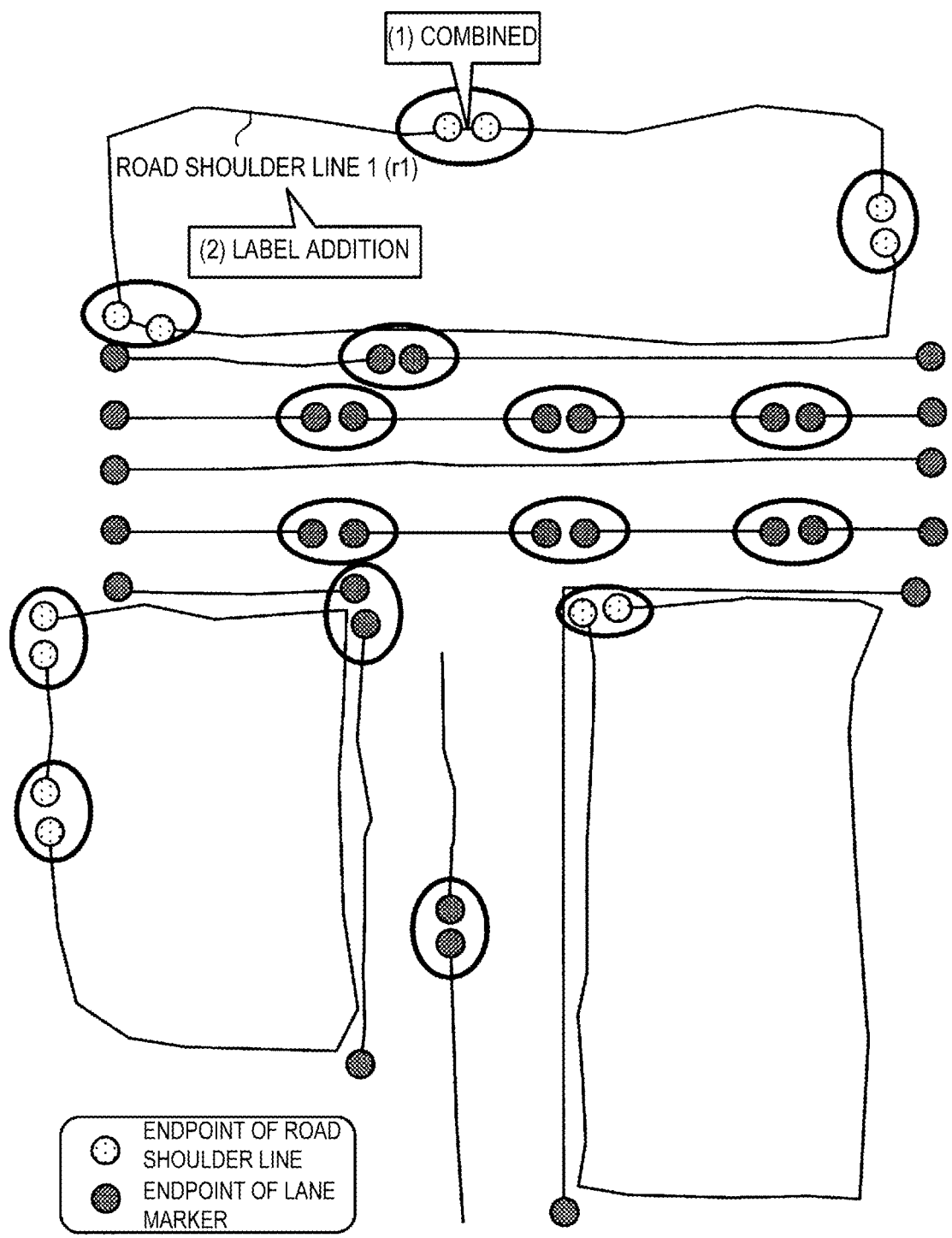
FIG. 7 is a diagram illustrating a flow of the processing executed by the road coordinate conversion device illustrated in FIG. 2.

First of all, how a lane polygon is generated will be described with reference to FIGS. 6 to 12. FIG. 6 is a diagram in which, based on the longitude/latitude data on the road shoulder line and the longitude/latitude data on the lane marker of the road map data 40 used in the processing, each road shoulder line and each lane marker are displayed two dimensionally.

As illustrated in FIG. 6, the road map data 40 often has road shoulder lines and lane markers partially depicted. Thus, the lane polygon generation unit 52 generates one road shoulder line by combining endpoints of two adjacent road shoulder lines when the distance between the endpoints of the two adjacent road shoulder lines is equal to or shorter than L (see (1) in FIG. 7). Then, the lane polygon generation unit 52 adds a label to the generated road shoulder line (see (2) in FIG. 7). For example, the lane polygon generation unit 52 adds a label "r1" to a single road shoulder line "1" obtained by combining endpoints at three locations.

The lane polygon generation unit 52 combines endpoints of two adjacent lane markers when the distance between the endpoints of the two lane markers is equal to or shorter than L, and adds a label to the resultant lane marker. L is set, for example, to 3 m (average width of the lane). Note that the distance between the endpoints of two adjacent road shoulder lines and the distance between the endpoints of two adjacent lane markers described above may be set to different distances depending on the average width of the road or lane.

Figure 8:
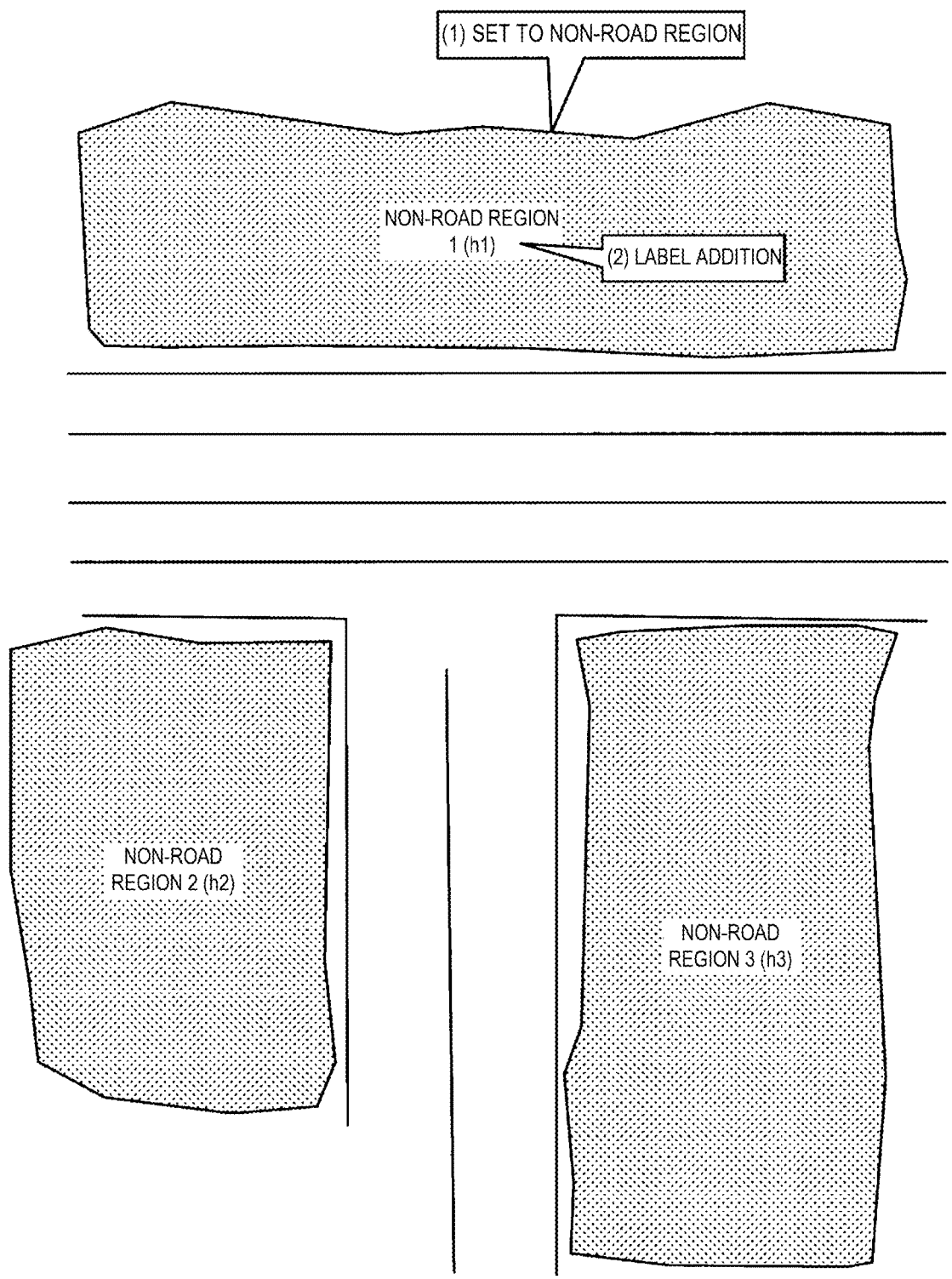
FIG. 8 is a diagram illustrating a flow of the processing executed by the road coordinate conversion device illustrated in FIG. 2.

The lane polygon generation unit 52 sets a region surrounded by a road shoulder line to be a non-road region (see (1) in FIG. 8), and obtains a polygon of the non-road region. Then, the lane polygon generation unit 52 adds a unique label to each non-road region where the polygon has been obtained (see (2) in FIG. 8). For example, the lane polygon generation unit 52 adds a label "h1" to a non-road region "1".

The lane polygon generation unit 52 draws, in the outward direction of the non-road region, a vertical bisector for a line between a point n forming a side of each non-road region and a point n+1 adjacent to the point n. The point n and the point n+1 are set to be on a side of the non-road region at a predetermined interval, for example. For example, the lane polygon generation unit 52 draws a vertical bisector v1 in the outward direction of the non-road region h1 with respect to the line between the point n and the point n+1 in the non-road region h1 (see FIG. 9 (1)).

The lane polygon generation unit 52 stores a first non-road region A crossed by the vertical bisector, as well as all lane markers (including the road shoulder line) B crossed by the vertical bisector before reaching the first non-road region A. Specifically, the lane polygon generation unit 52 stores points c1 to c5 on the vertical bisector v1 of all the lane markers B crossed by the vertical bisector v1 before reaching a first non-road region h2, with the first non-road region h2 crossed by the vertical bisector v1 defined as A (see FIG. 10). Note that a point c6 is an intersection between the vertical bisector v1 and a side of the non-road region h2.

The lane polygon generation unit 52 calculates a distance between a starting point of the vertical bisector and a point on the lane marker B adjacent to the starting point, a distance between an intersection of the first non-road region A crossed by the vertical bisector v1 and a point on the lane marker B adjacent to the intersection, and a distance between points on the adjacent lane markers B. Then, when the distance calculated is equal to or longer than L (for example, 3 m which is an average lane width), the lane polygon generation unit 52 stores the distance with a label added to the points. The first half of the label indicates the non-road region which is the starting point of the vertical bisector and the first non-road region A crossed by the vertical bisector, and the second half of the label indicates the crossing order of the vertical bisector "n (1≤n≤N (maximum value)".

Figure 11:
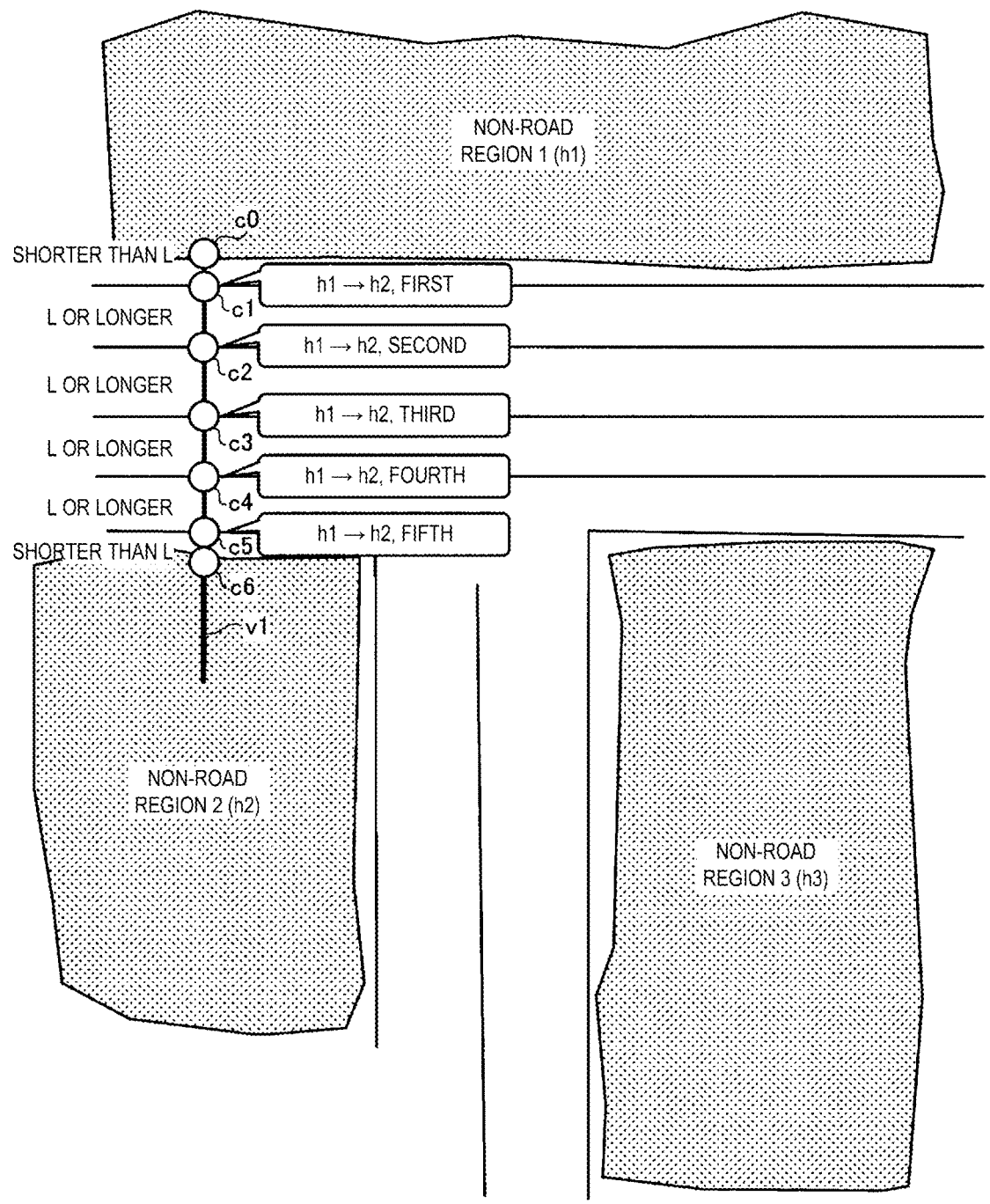
FIG. 11 is a diagram illustrating a flow of the processing executed by the road coordinate conversion device illustrated in FIG. 2.

First of all, as illustrated in FIG. 11, the lane polygon generation unit 52 calculates a distance between a starting point c0 of the vertical bisector v1 and the point c1 on the adjacent lane marker B. In this case, the distance thus calculated is shorter than L, and thus the lane polygon generation unit 52 does not add a label. Next, the lane polygon generation unit 52 calculates a distance between the point c1 which is the first point crossed by the vertical bisector v1, and the point c2 which is the second point crossed by the vertical bisector v1. In this case, because the distance thus calculated is equal to or longer than L, the lane polygon generation unit 52 adds a label "h1→h2, first" to the point c1 and adds a label "h1→h2, second" to the point c2. By executing the same processing, the lane polygon generation unit 52 adds a label "h1→h2, third", a label "h1→h2, fourth", and a label "h1→h2, fifth" respectively to the points c3 to c5.

Figure 9:
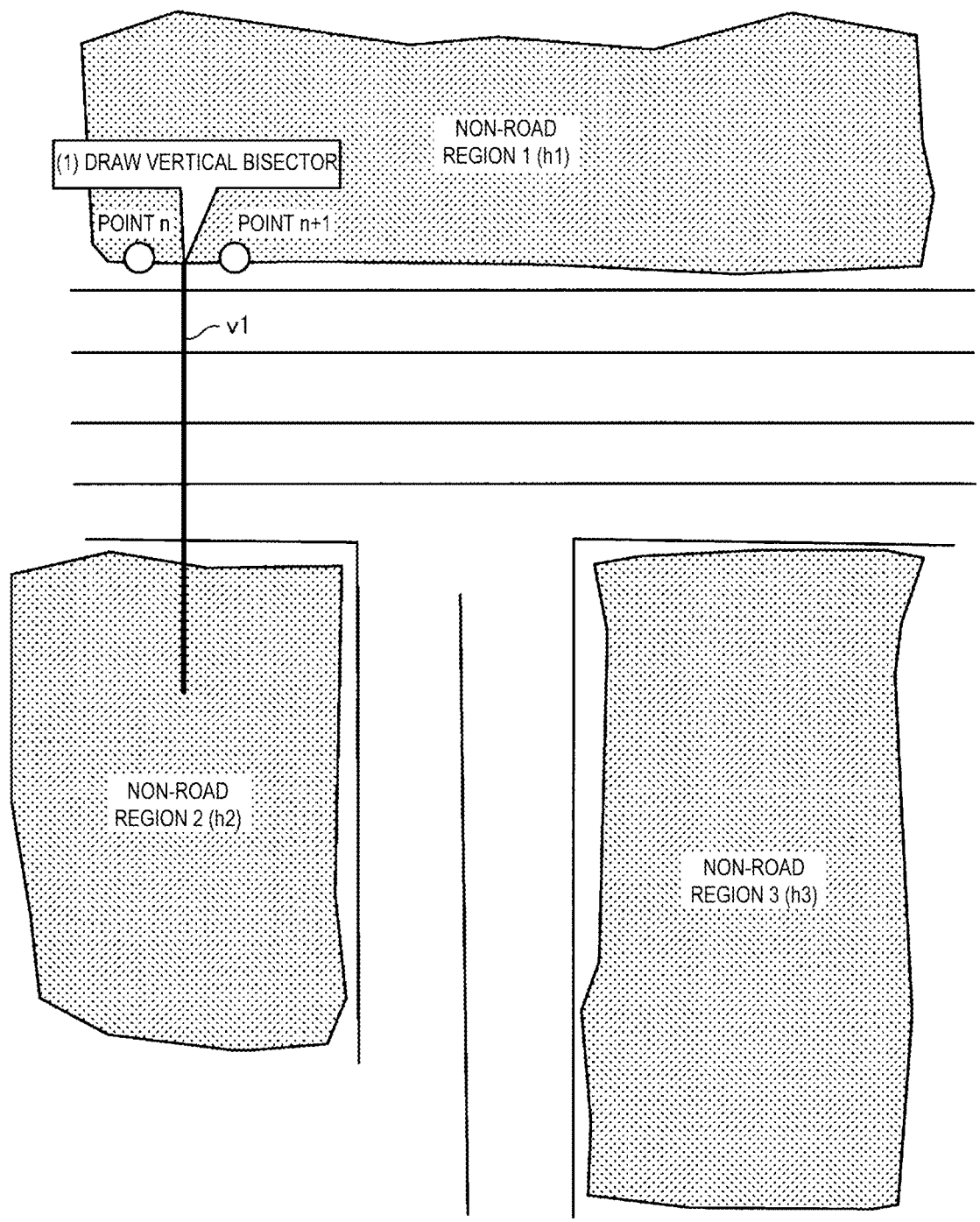
FIG. 9 is a diagram illustrating a flow of the processing executed by the road coordinate conversion device illustrated in FIG. 2.
Figure 10:
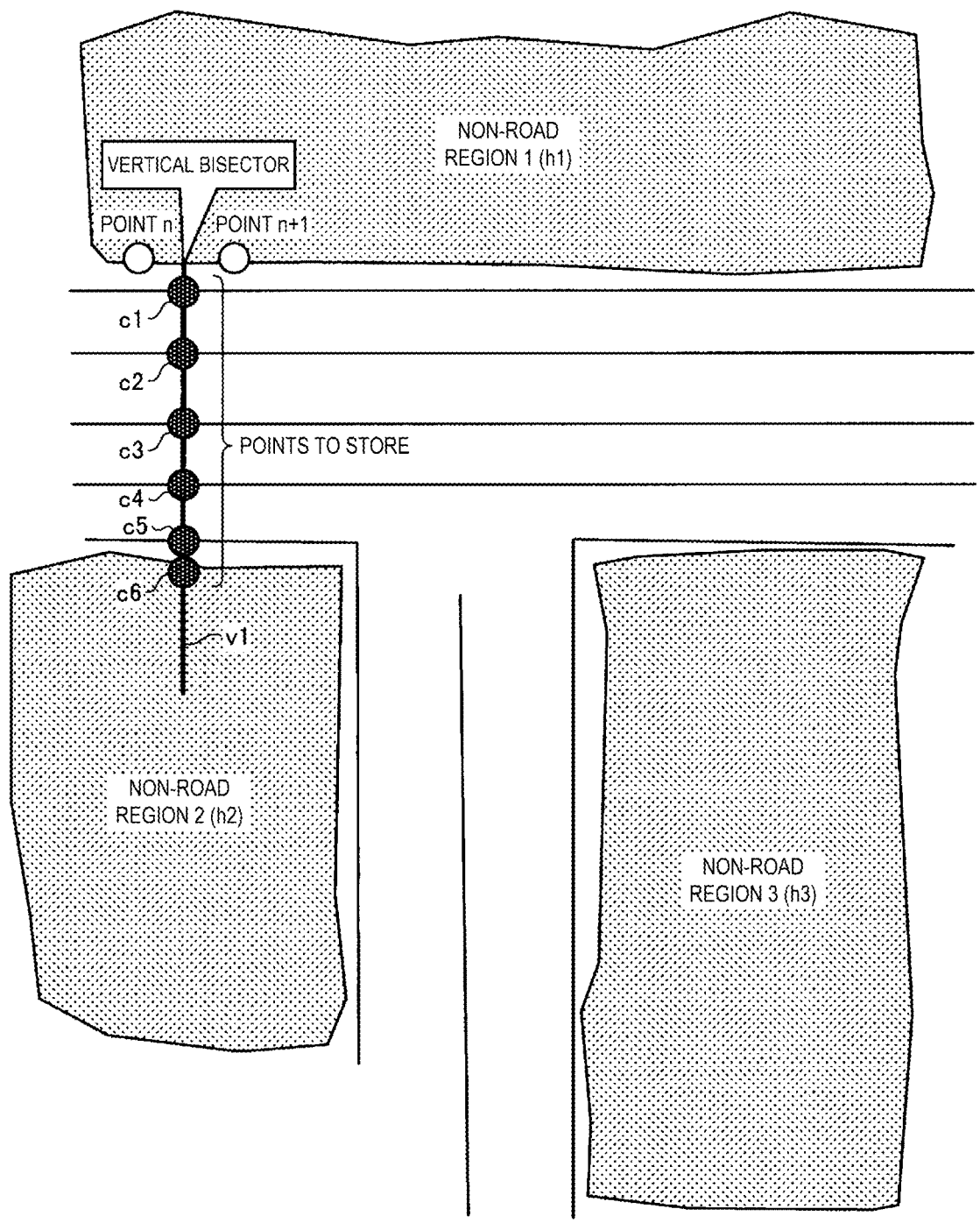
FIG. 10 is a diagram illustrating a flow of the processing executed by the road coordinate conversion device illustrated in FIG. 2.

Then, the lane polygon generation unit 52 repeatedly executes the processing illustrated in FIGS. 9 to 11, with the starting point of the vertical bisector in the non-road region h1 moved by a predetermined distance each time the processing is executed. As a result, the labeled points are set on the lane marker to be separated from one another by a predetermined distance.

Next, the lane polygon generation unit 52 refers to the label added to each point, and clockwise combines, among the points to which the labels with the same first half are added, points having "n" and "n+1" as the crossing order indicated by the second half of the labels, to generate a lane polygon.

Figure 12:
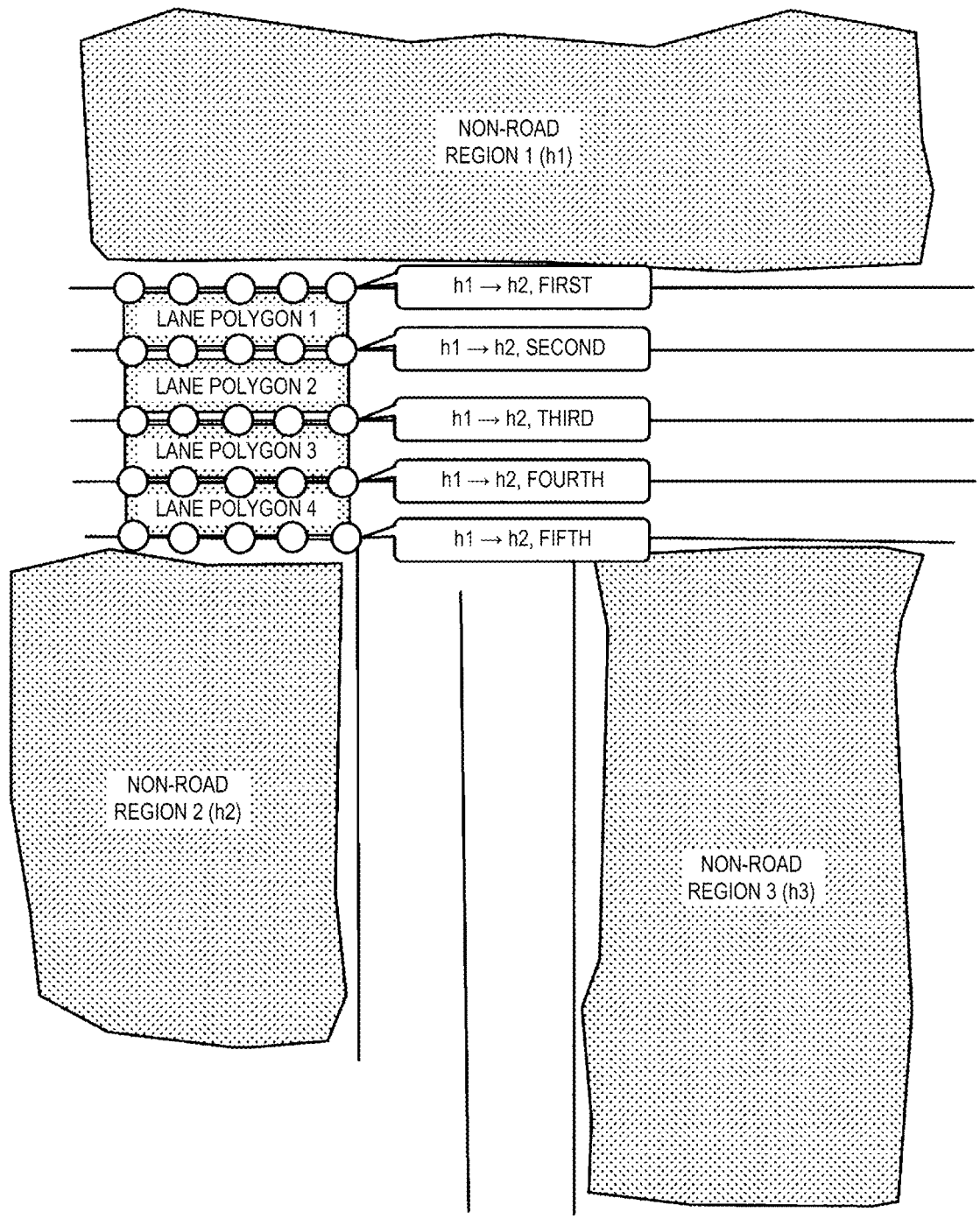
FIG. 12 is a diagram illustrating a flow of the processing executed by the road coordinate conversion device illustrated in FIG. 2.
Figure 14:
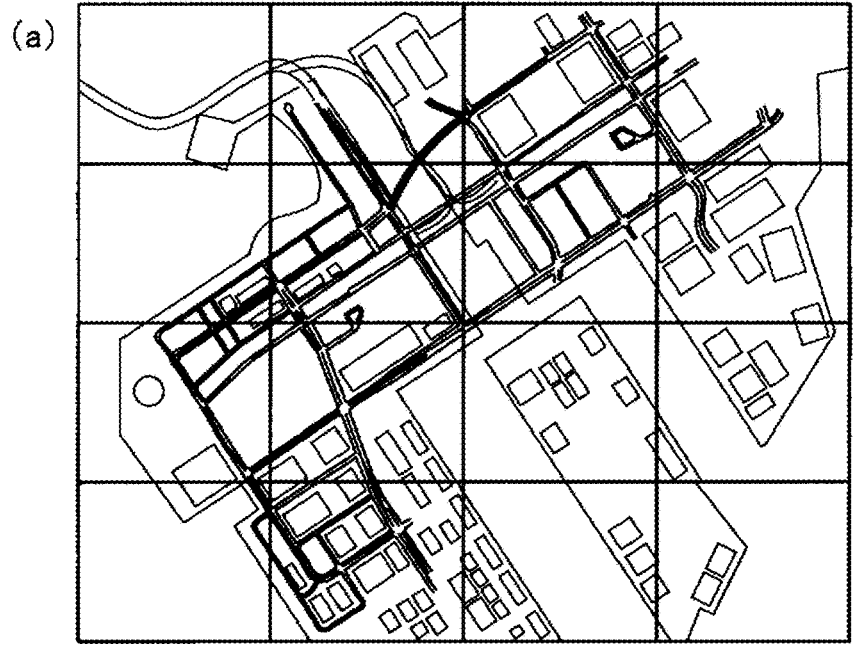
FIG. 14 is a diagram illustrating a flow of the processing executed by the road coordinate conversion device illustrated in FIG. 2.
Figure 14:
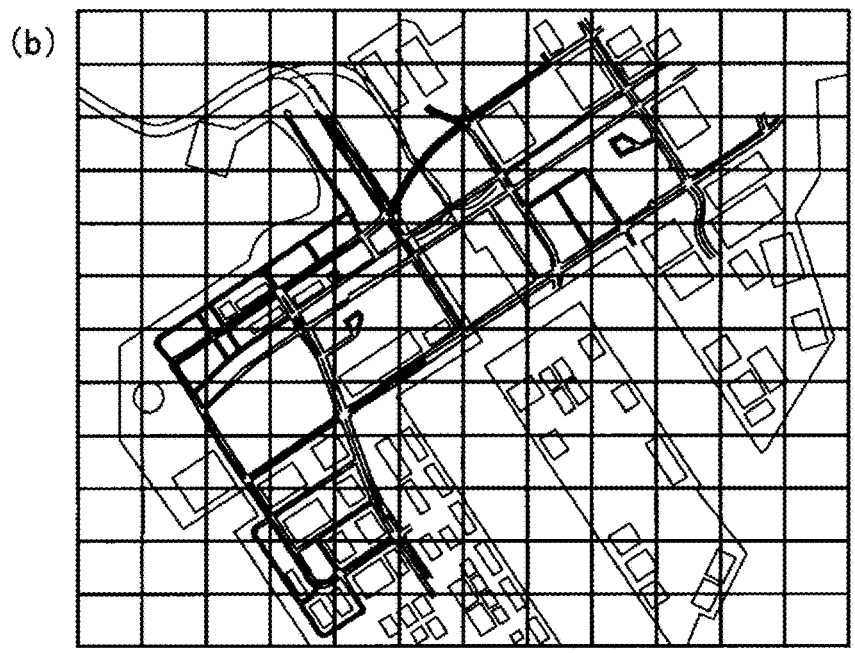
Figure 14:

As illustrated in FIG. 12, the lane polygon generation unit 52 clockwise combines, among the points on the lane markers between the non-road region h1 and the non-road region h2 to which the labels with the first half indicating "h1→h2" are added, points having "first" indicated by the second half of the labels and having "second" indicated by the second half of the labels. Thus, the lane polygon generation unit 52 generates a lane polygon 1. In addition, the lane polygon generation unit 52 clockwise combines, among the points on the lane markers to which the labels with the first half indicating "h1→h2" are added, points having "second" indicated by the second half of the labels and points having "third" indicated by the second half of the labels, to generate a lane polygon 2.

In this manner, the lane polygon generation unit 52 generates a plurality of lane polygons from longitude/latitude data on road shoulder lines and lane markers in road map data.

Next, how the mesh polygon generation unit 53 generates a mesh polygon will be described with reference to FIG. 13 to FIG. 16. The accuracy (number of digits) of the spatial index (geohash) is input to the mesh polygon generation unit 53. Upon acquiring, from an external file prepared in advance, mesh information including values of the longitude and latitude within a polygon search range, the mesh polygon generation unit 53 determines the mesh division size based on the input accuracy, and generates a spatial index equivalent to the meshes of the all search range. The mesh information may be in any data format, but is assumed herein to be represented by values of the longitude (expressed in decimal digits) and of the latitude (expressed in decimal digits), as illustrated in FIG. 13, for example.

For example, as illustrated in FIG. 14(a), upon receiving the input of an accuracy of 15 digits for the latitude and 14 digits for the longitude, the mesh polygon generation unit 53 determines the mesh division size of 1.25 km×1.25 km. For example, as illustrated in FIG. 14(b), upon receiving the input of an accuracy of 18 digits for the latitude and 17 digits for the longitude, the mesh polygon generation unit 53 determines the mesh division size of 150 m×150 m.

Figure 15:
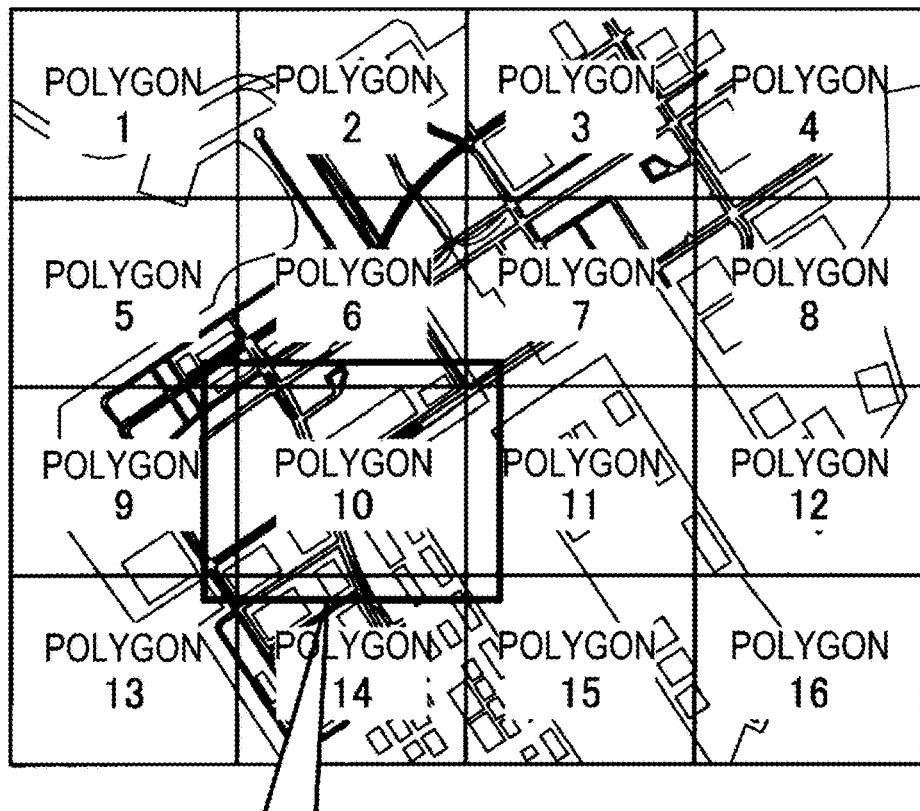
FIG. 15 is a diagram illustrating a flow of the processing executed by the road coordinate conversion device illustrated in FIG. 2.
Figure 15:
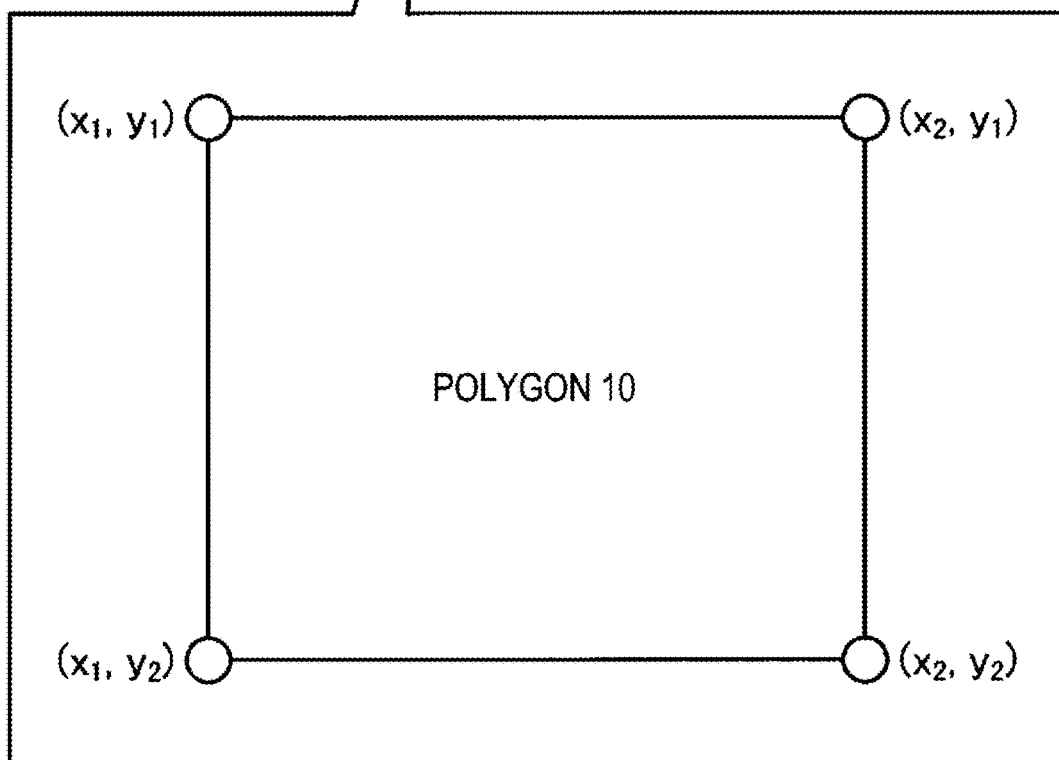

The mesh polygon generation unit 53 then generates a mesh polygon for representing all geohashes in accordance with the determined mesh division. Specifically, as illustrated in FIG. 15, in the case of the accuracy of 15 digits for the latitude and 14 digits for the longitude, the mesh polygon generation unit 53 determines a polygon with the size of 1.25 km×1.25 km. For example, of a plurality of polygons, a polygon 10 has coordinates of the vertices of the polygon set to be (x1,y1), (x2,y1), (x2,y2), and (x1,y2).

Figure 16:
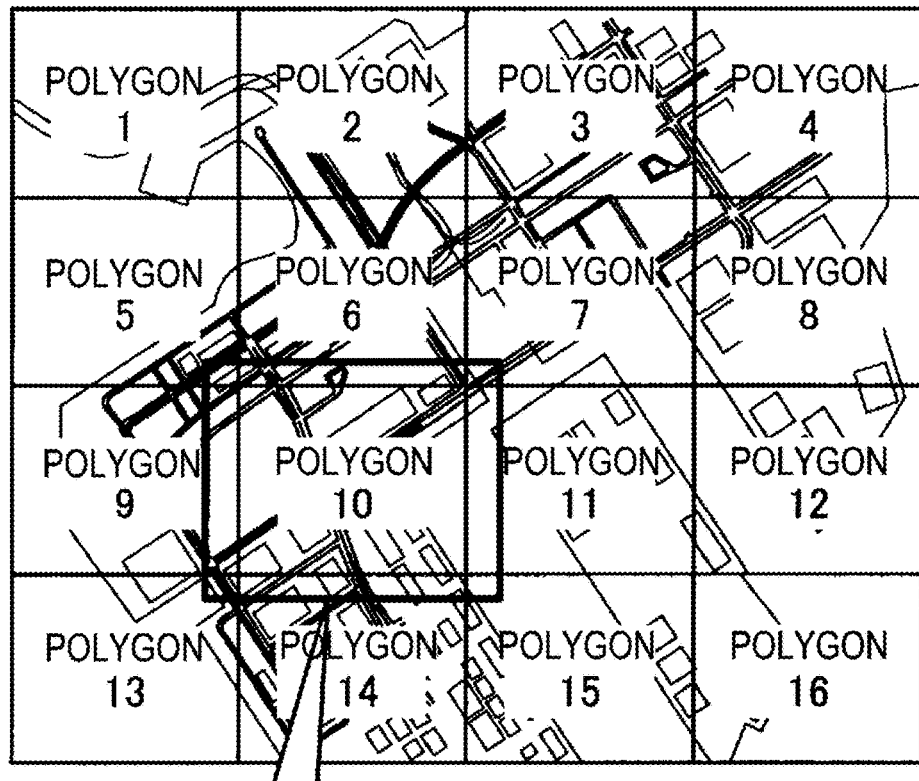
FIG. 16 is a diagram illustrating a flow of the processing executed by the road coordinate conversion device illustrated in FIG. 2.
Figure 16:
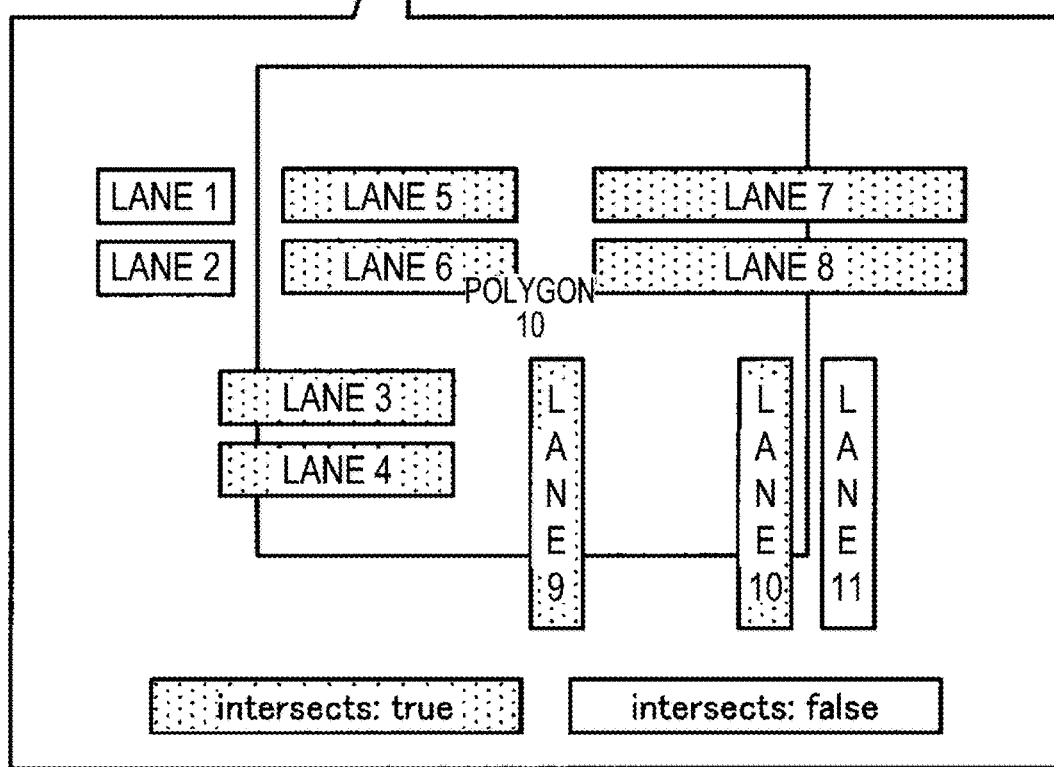

Then, the mesh polygon generation unit 53 stores a lane polygon in an "Intersect" relationship with each mesh polygon. An Intersect function according to JIS or the like is assumed as the Intersect. As illustrated in FIG. 16, the mesh polygon generation unit 53 stores lane polygons of lanes 3 to 10.

Figure 17:
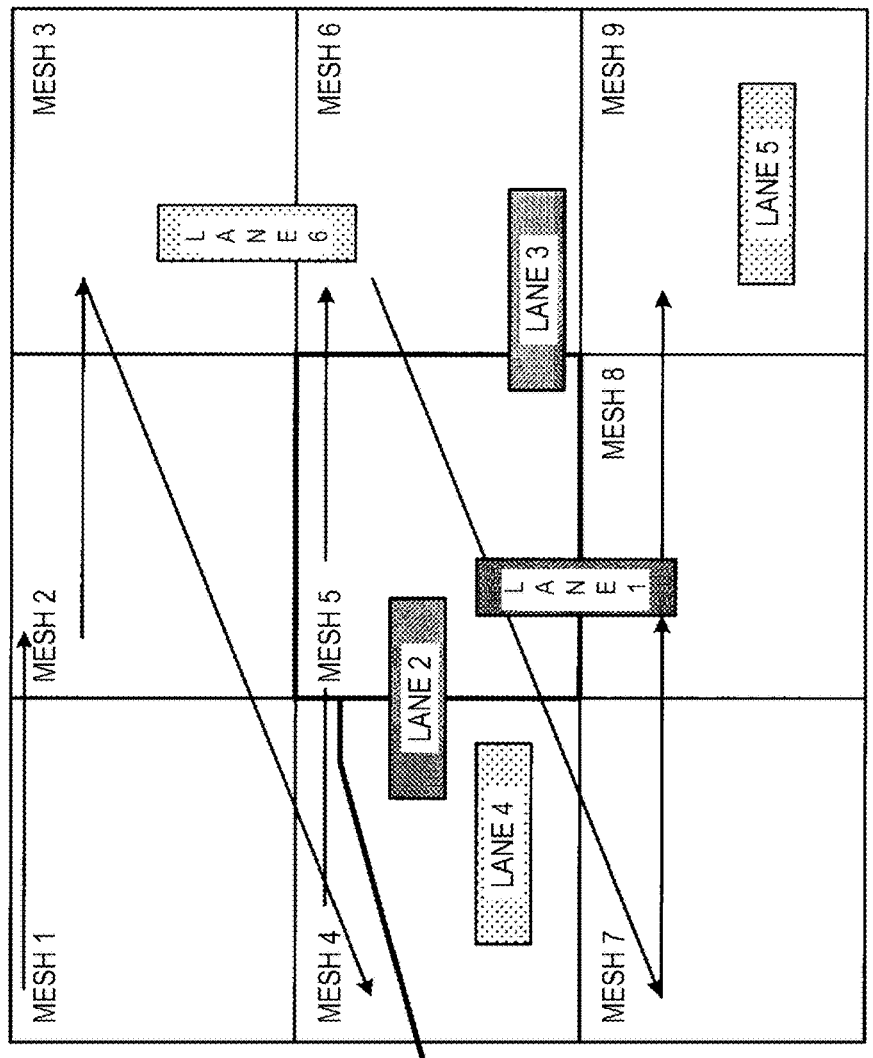
FIG. 17 is a diagram illustrating a flow of the processing executed by the road coordinate conversion device illustrated in FIG. 2.

For example, the mesh polygon generation unit 53 searches each mesh for a lane polygon included in the mesh, and adds the spatial index to the retrieved lane polygon. The mesh polygon generation unit 53 may add, as the lane ID, a value that is a non-overlapping serial number in the mesh, to the retrieved lane polygon. For example, the mesh polygon generation unit 53 searches, as illustrated in FIG. 17, a lane polygon included in a mesh 1 to a mesh 9 in this order, and adds a spatial index to the lane polygon thus retrieved. In the example illustrated in FIG. 17, lanes 1, 2, and 3 included in the mesh 5 are extracted in the search for example, and thus the mesh polygon generation unit 53 adds the spatial index to the lanes 1, 2, and 3.

Figure 18:
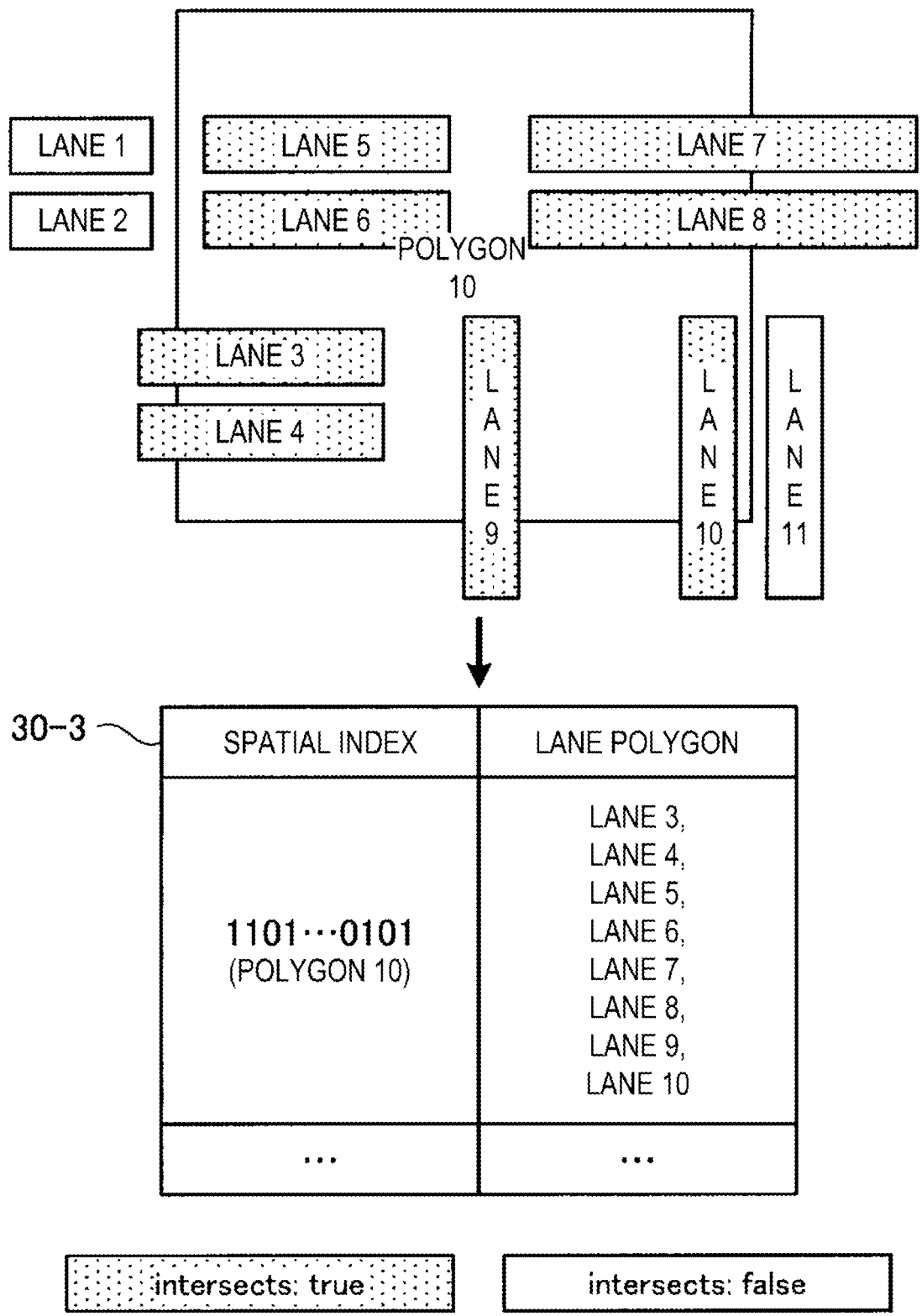
FIG. 18 is a diagram illustrating a flow of the processing executed by the road coordinate conversion device illustrated in FIG. 2.

The storage unit 54 stores, in the road coordinate DB 30, each spatial index and a lane polygon corresponding to each spatial index. For example, as illustrated in FIG. 18, for the polygon 10, the storage unit 54 stores, in the road coordinate DB 30, data 30-3 in which the spatial index of the polygon 10 and the lane polygons of the lanes 3 to 10 in the Intersect relationship with the polygon 10 are associated with each other.

Figure 19:
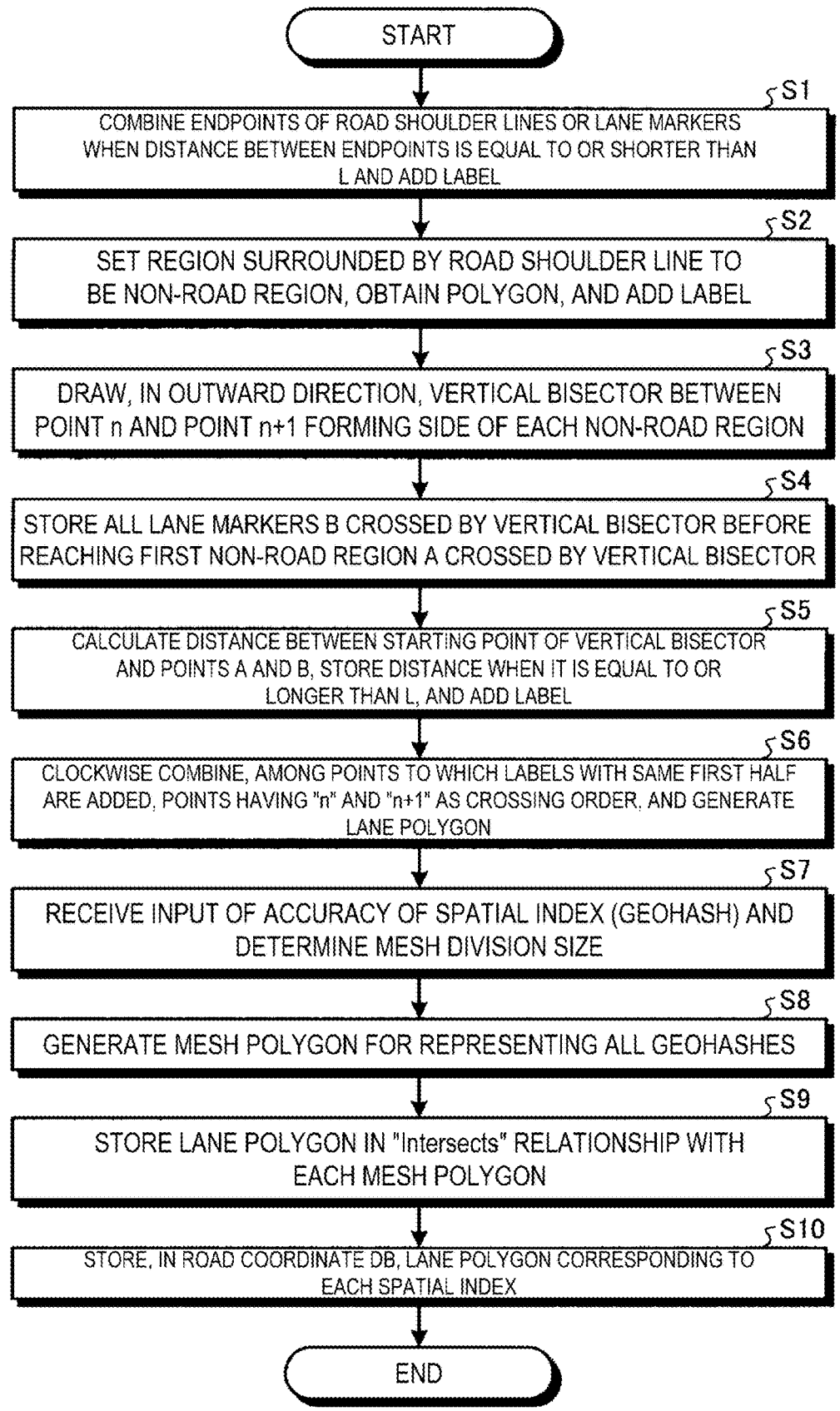
FIG. 19 is a flowchart illustrating a processing procedure for road coordinate conversion processing according to the first embodiment.

Processing Procedure of Road Coordinate Conversion Processing FIG. 19 is a flowchart illustrating a processing procedure for road coordinate conversion processing according to the present embodiment.

As illustrated in FIG. 19, the road coordinate conversion device 50 receives an input of the road map data 40, and executes processing of generating a lane polygon. First, the lane polygon generation unit 52 refers to the road map data 40, and executes processing of combining the endpoints of two adjacent lane markers or the endpoints of the two adjacent lane markers when the distance between the endpoints of the two road shoulder lines or the distance between the endpoints of the two lane markers is equal to or shorter than L, and adding a label to the resultant road shoulder line or lane marker (step S1).

The lane polygon generation unit 52 executes processing of setting a region surrounded by a road shoulder line to be a non-road region, obtaining a polygon of the non-road region, and adding a label to the non-road region where the polygon has been obtained (step S2). The lane polygon generation unit 52 draws, in the outward direction of the non-road region, a vertical bisector for a line between a point n and a point n+1 forming a side of each non-road region (step S3).

The lane polygon generation unit 52 stores a first non-road region A crossed by the vertical bisector, as well as all lane markers B crossed by the vertical bisector before reaching the first non-road region A (step S4). The lane polygon generation unit 52 calculates a distance between the starting point of a vertical bisector and a point on the lane marker B adjacent to the starting point, a distance between an intersection of the first non-road region A crossed by the vertical bisector and a point on the lane marker B adjacent to the intersection, and a distance between points on the adjacent lane markers B, stores the distances when the calculated distances are equal to or longer than L, and adds a label to the points (step S5). The lane polygon generation unit 52 repeatedly executes the processing in step S3 to step S5, with the starting point of the vertical bisector in the non-road region h1 moved by a predetermined distance each time the processing is executed.

Next, the lane polygon generation unit 52 refers to the label added to each point, and clockwise combines, among the points to which the labels with the same first half are added, points having "n" and "n+1" as the crossing order indicated by the second half of the labels, to generate lane polygons (step S6).

Next, upon receiving an input of the accuracy (number of digits) of the spatial index (geohash), the mesh polygon generation unit 53 determines the mesh division size in accordance with the input accuracy (step S7). The mesh polygon generation unit 53 then generates a mesh polygon for representing all geohashes in accordance with the determined mesh division (step S8). The mesh polygon generation unit 53 stores a lane polygon in an "Intersect" relationship with each mesh polygon (step S9).

Then, the storage unit 54 stores, in the road coordinate DB 30, each spatial index and a lane polygon corresponding to each spatial index (step S10), and the road coordinate conversion device 50 terminates the road coordinate conversion processing.

Effects of First Embodiment

As described above, the road coordinate conversion device 50 according to the first embodiment receives the input of the road map data, refers to the road map data, and generates a lane polygon indicating a lane region. Then, the road coordinate conversion device 50 generates, for each spatial mesh divided into a predetermined size, a mesh polygon representing the spatial index, determines in which spatial mesh a lane polygon exists, and in accordance with the result of the determination, stores the data on the lane polygon and the data on the mesh polygon in the road coordinate DB 30 in association with each other.

The road coordinate conversion device 50 manages polygons, with road polygons stored for each range divided by a spatial mesh (geohash). That is, the road coordinate conversion device 50 determines whether the polygon exists in a mesh separated by a spatial mesh, and then stores the polygons in the road coordinate DB 30 in association with the spatial mesh. With this configuration, when the spatial mesh to be searched is obtained in advance by calculation at the time of search processing, for example, the road coordinate conversion device 50 enables high speed search with many determinations omitted.

Furthermore, the road coordinate conversion device 50 according to the first embodiment refers to the road map data including the longitude/latitude data on the road shoulder lines and the longitude/latitude data on the lane markers, sets a region surrounded by the road shoulder line to be a non-road region, and generates a lane polygon indicating the lane region based on data on two adjacent non-road regions and on the lane markers positioned between the two non-road regions.

In the present embodiment, road shoulder lines and lane markers that are white lines detectable by an in-vehicle sensor device such as LIDAR are used, whereby the lane polygon indicating the lane region can be accurately generated compared with a related-art method using the center line of the lane.

Figure 20:
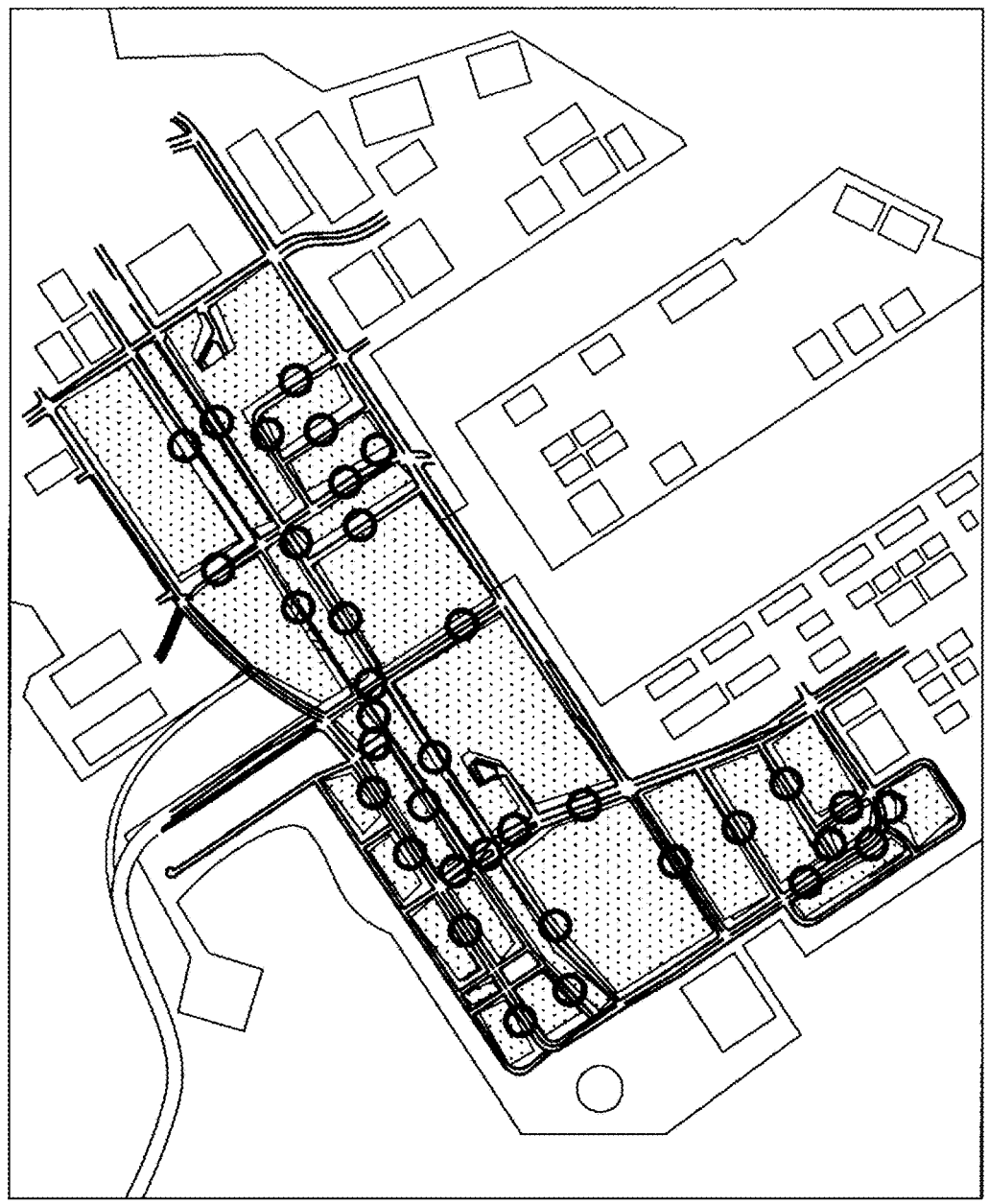
FIG. 20 is a diagram illustrating an example of a lane polygon capable of being generated by the road coordinate conversion device.

FIG. 20 is a diagram illustrating an example of a lane polygon capable of being generated by the road coordinate conversion device 50. As illustrated in FIG. 20, the road coordinate conversion device 50 sets a region surrounded by a road shoulder line to be a non-road region. The road coordinate conversion device 50 generates a lane polygon based on this non-road region, and thus can accurately generate a lane polygon for a circled portion between non-road regions. As a result, in the communication system 100, the lane polygon generated accurately by the road coordinate conversion device 50 is used, whereby accuracy can be improved for the lane congestion detection and the like.

The road coordinate conversion device 50 generates a mesh polygon representing a spatial index, and stores, in the road coordinate DB 30, the data on the mesh polygon and the data on the lane polygon corresponding to the mesh polygon in association with each other. Thus, the road coordinate DB 30 can output, to the spatiotemporal analysis application 10, the road coordinate search result D1 including a lane polygon that accurately represents the lane region.

Then, the road coordinate conversion device 50 determines that a section between two adjacent road shoulder lines is a road when the distance between the two road shoulder lines is equal to or longer than a predetermined distance, and determines that a section between two lane markers is a lane when the distance between the two lane markers is equal to or longer than a predetermined distance. In this manner, the road coordinate conversion device 50 can appropriately generate a lane polygon to properly determine the road and lane.

The road coordinate conversion device 50 combines endpoints of two adjacent road shoulder lines when the distance between the endpoints of the two road shoulder lines is equal to or shorter than L, and combines endpoints of two adjacent lane markers when the distance between the endpoints of the two lane markers is equal to or shorter than L. The road coordinate conversion device 50 combines incomplete road shoulder lines and lane markers in the road map data 40 to correct the road shoulder lines and the lane markers, and thus can appropriately set non-road regions and the lane markers, whereby the lane polygon can be generated with higher accuracy.

Second Embodiment

Next, a second embodiment will be described. In the first embodiment, a case has been described in which, with reference to the road map data, a region surrounded by a road shoulder line is set to be a non-road region, and a lane polygon is generated using data on two adjacent non-road regions and on the lane markers positioned between the two non-road regions. However, the present invention is not limited to this case. For example, with reference to the road map data, a lane polygon may be generated based on the intersection on a lane marker or a road shoulder line crossed by a vertical line in lane information.

Then, in the following second embodiment, a case is described in which the lane polygon generation unit 52 refers to the road map data and generates a first polygon indicating a lane region based on the intersection on a lane marker or a road shoulder line crossed by a vertical line in the lane information. Further, description of configurations and processes similar to those of the first embodiment will be omitted as appropriate.

Road Coordinate Management System

Figure 21:
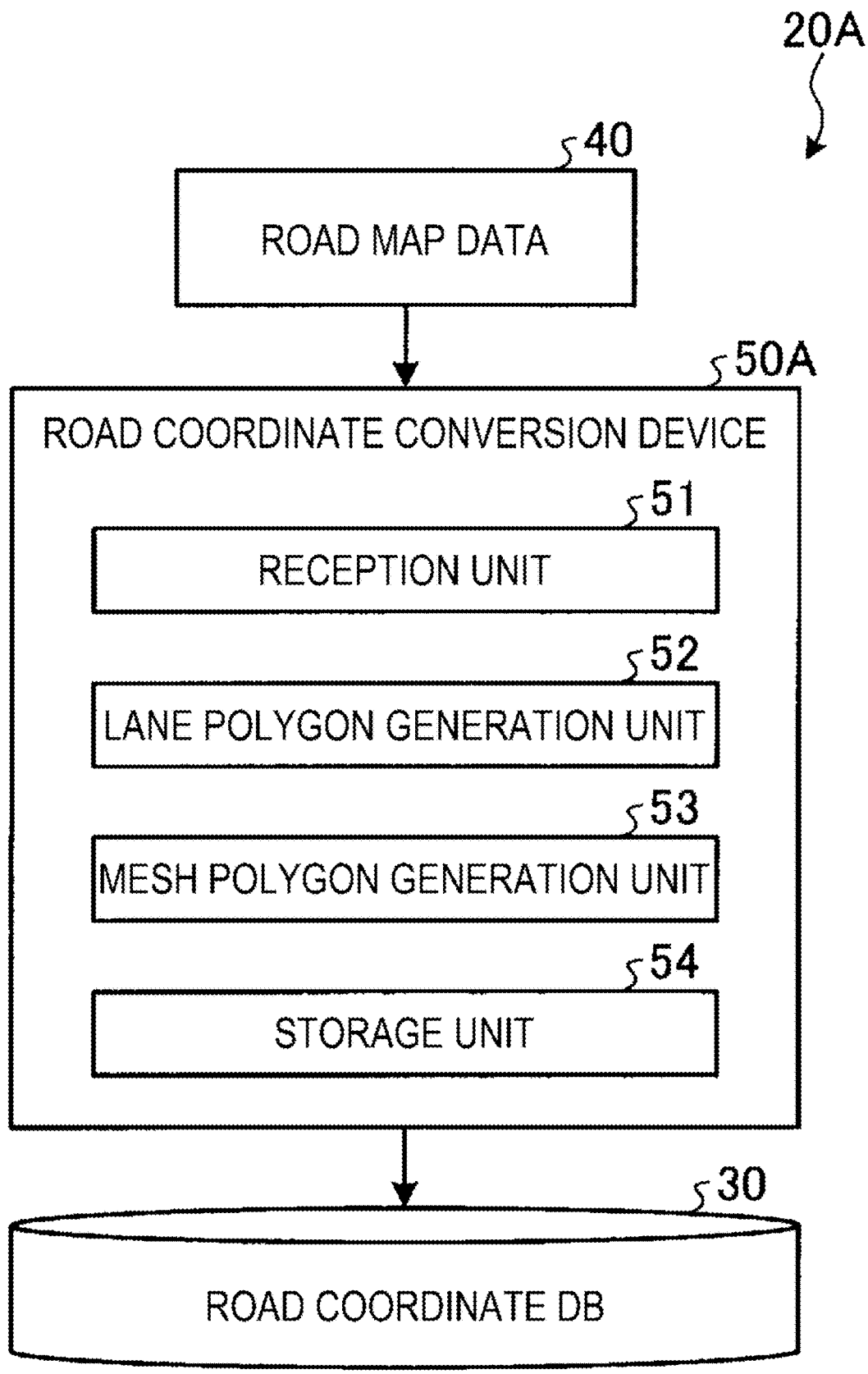
FIG. 21 is a diagram illustrating an example of a configuration of a road coordinate management system according to a second embodiment.

A road coordinate management system 20A according to the second embodiment will be described below. FIG. 21 is a diagram illustrating an exemplary configuration of the road coordinate management system 20A according to the second embodiment. As illustrated in FIG. 21, the road coordinate management system 20A includes a road coordinate conversion device 50A and a road coordinate DB 30.

Road Coordinate Conversion Device

The configuration of the road coordinate conversion device 50A according to the second embodiment will be described below. The road coordinate conversion device 50A includes a reception unit 51, a lane polygon generation unit 52 (first generation unit), a mesh polygon generation unit 53 (second generation unit), and a storage unit 54.

The reception unit 51 receives an input of road map data 40 including longitude/latitude data on lane information indicating the center line of a lane, longitude/latitude data on a road shoulder line, longitude/latitude data on a lane marker. The road map data 40 includes latitude/longitude data 40-1 on the road shoulder line, the lane marker, and the like, as illustrated in FIG. 3 for example.

The lane polygon generation unit 52 refers to the road map data 40 and generates a lane polygon (see, for example, 50-1 in FIG. 3) indicating a lane region based on the intersection on the lane marker or the road shoulder line crossed by a vertical line in the lane information. Specifically, the lane polygon generation unit 52 generates a lane polygon by combining the intersections on the lane markers or the road shoulder lines crossed by the vertical line in the lane information.

The mesh polygon generation unit 53 generates a mesh polygon representing a spatial index.

The storage unit 54 determines in which spatial mesh the lane polygon exists, and in accordance with the result of the determination, stores the data on the lane polygon and the data on the mesh polygon in the road coordinate DB 30 in association with each other.

In this manner, the road coordinate conversion device 50A realizes polygon generation by generating the lane polygon using a white line such as the road shoulder line and the lane marker and then performing filtering using the spatial index.

Flow of Processing Executed by Road Coordinate Conversion Device Now, a flow of processing executed by the road coordinate conversion device 50A will be described in detail. FIGS. 22 to 27 are diagrams illustrating a flow of the processing executed by the road coordinate conversion device 50A illustrated in FIG. 21.

Figure 22:
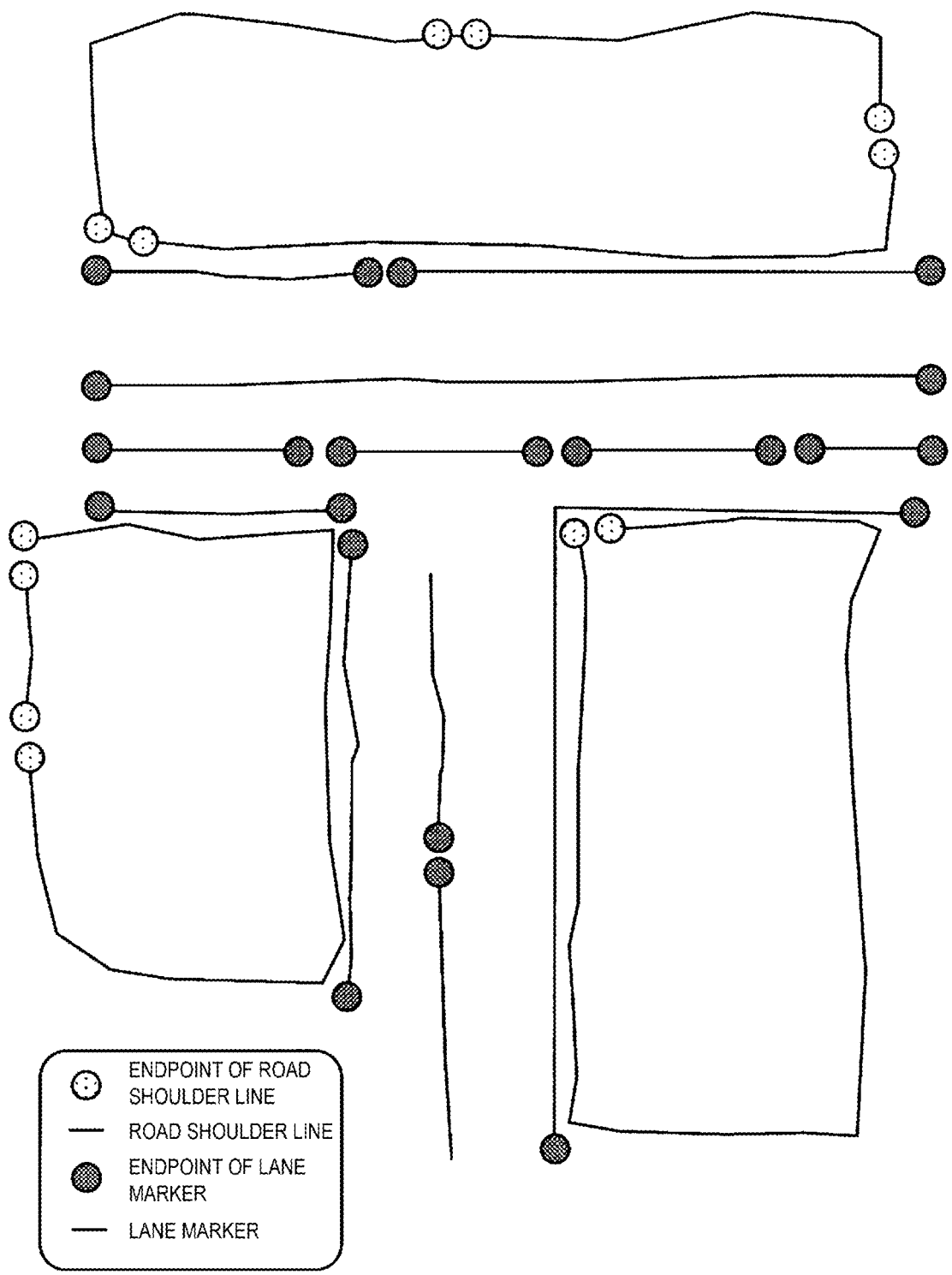
FIG. 22 is a diagram illustrating a flow of the processing executed by a road coordinate conversion device illustrated in FIG. 21.
Figure 23:
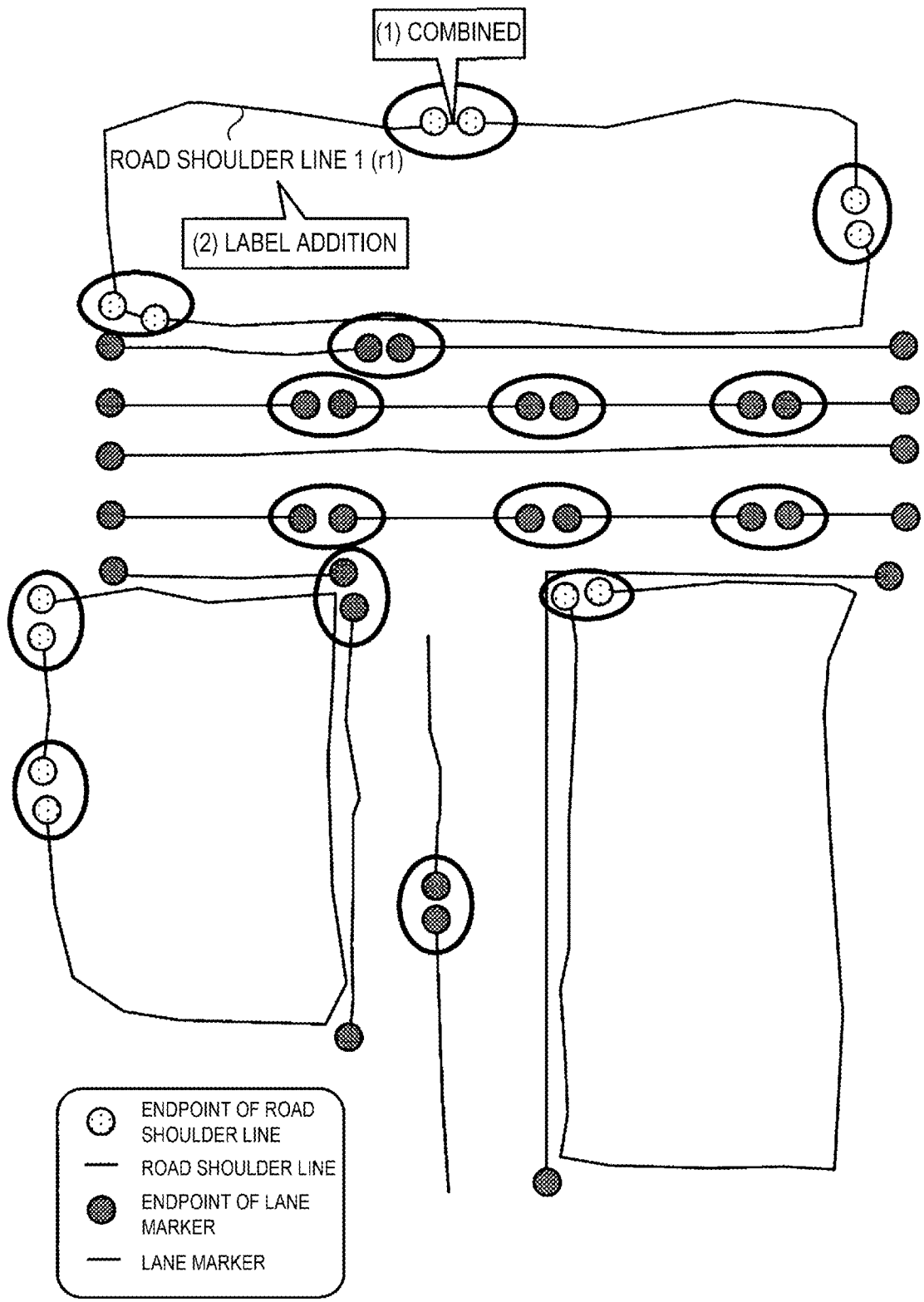
FIG. 23 is a diagram illustrating a flow of the processing executed by the road coordinate conversion device illustrated in FIG. 21.

First of all, how a lane polygon is generated will be described with reference to FIGS. 22 to 27. FIG. 22 is a diagram in which, based on the longitude/latitude data on the road shoulder line and the longitude/latitude data on the lane marker of the road map data 40 used in the processing, each road shoulder line and each lane marker are displayed two dimensionally.

As illustrated in FIG. 22, the road map data 40 often has road shoulder lines and lane markers partially depicted. Thus, the lane polygon generation unit 52 generates one road shoulder line by combining endpoints of two adjacent road shoulder lines when the distance between the endpoints of the two road shoulder lines is equal to or shorter than L (see (1) in FIG. 23). Then, the lane polygon generation unit 52 adds a label to the generated road shoulder line (see (2) in FIG. 23). For example, the lane polygon generation unit 52 adds a label "r1" to a single road shoulder line "1" obtained by combining endpoints at three locations.

The lane polygon generation unit 52 combines endpoints of two adjacent lane markers when the distance between the endpoints of the two lane markers is equal to or shorter than L, and adds a label to the resultant lane marker. L is set, for example, to 3 m (average width of the lane).

Figure 24:
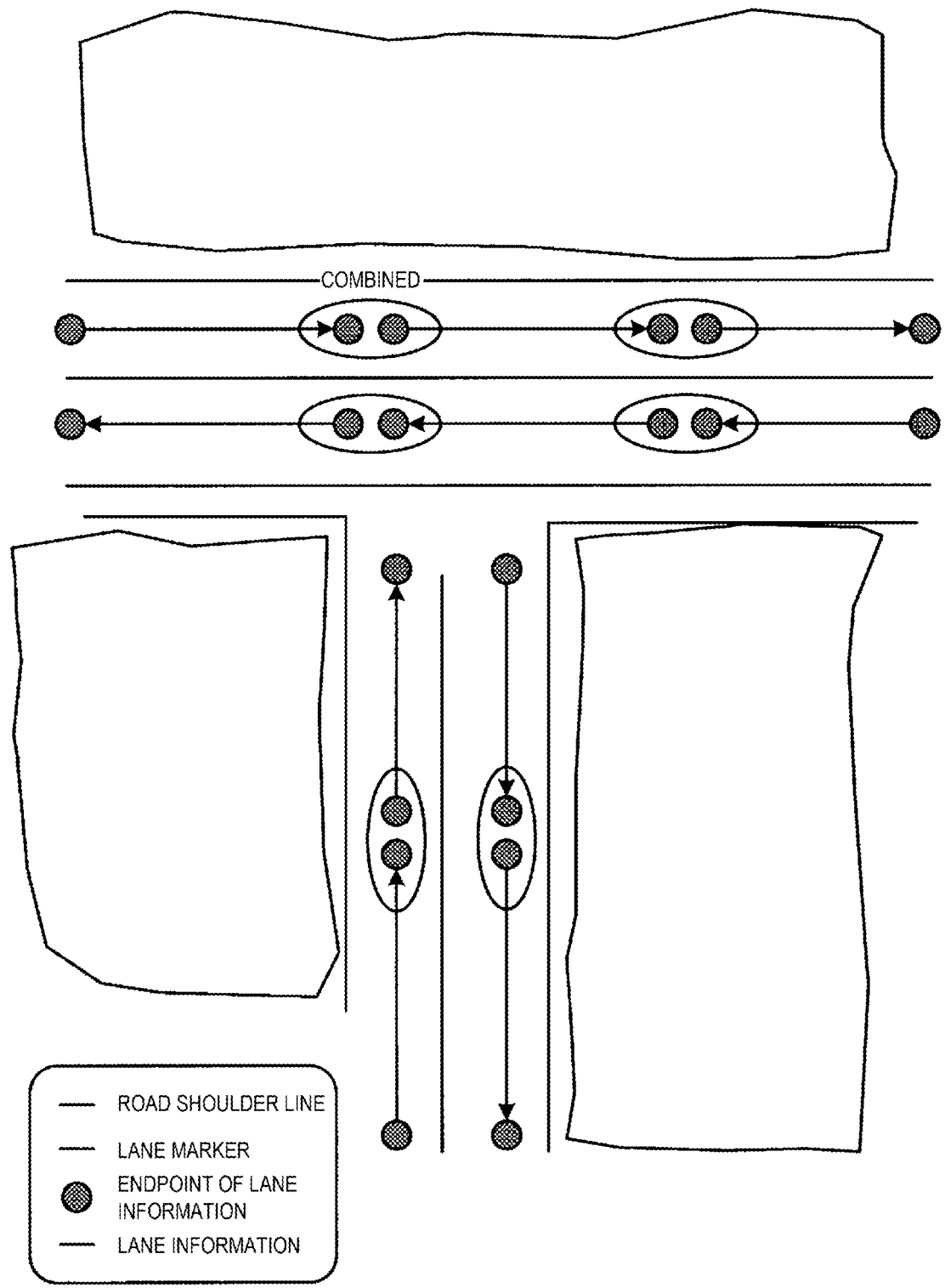
FIG. 24 is a diagram illustrating a flow of the processing executed by the road coordinate conversion device illustrated in FIG. 21.

In addition, as illustrated in FIG. 24, the lane polygon generation unit 52 combines the endpoints in the lane information when the distance between the endpoints is 0, and adds a label. Here, the lane information has endpoints arranged in a vehicle traveling direction, and thus combining of "starting point→starting point" and "terminal point→terminal point" is not performed. For example, the combining is performed only when the distance is 0. Note that the condition for the combining is not limited to the case where the distance is 0. Further, when there are a plurality of pieces of lane information that can be combined, the lane polygon generation unit 52 combines none of them.

The lane polygon generation unit 52 draws, in both directions, a vertical bisector for a section between a point n included in the combined lane information and a point n+1 adjacent to the point n. For example, as illustrated as an example in FIG. 25, the lane polygon generation unit 52 draws a vertical bisector having a length that is approximately 2 m. Note that the length of the vertical bisector is not limited and can be set as appropriate.

Figure 26:
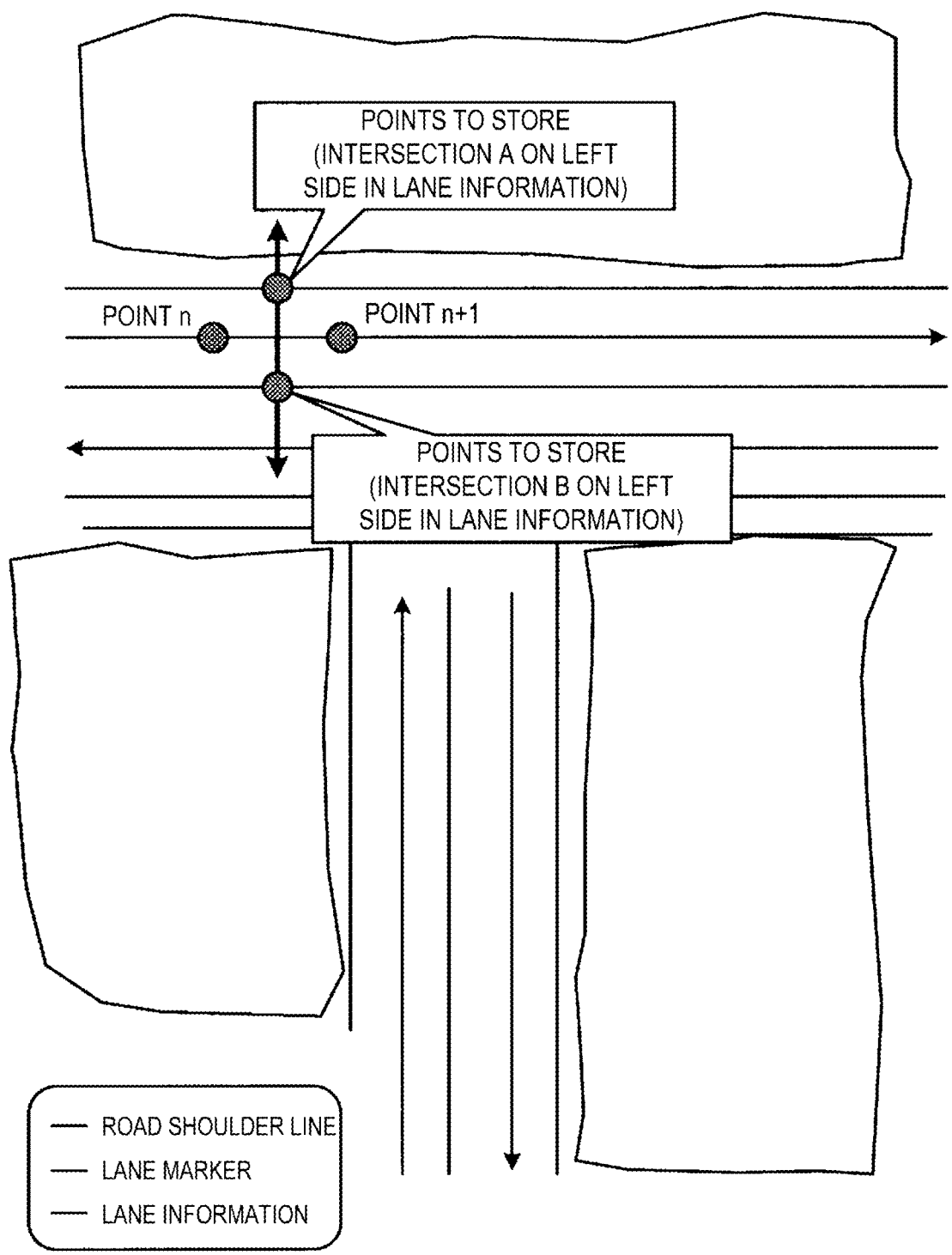
FIG. 26 is a diagram illustrating a flow of the processing executed by the road coordinate conversion device illustrated in FIG. 21.
Figure 27:
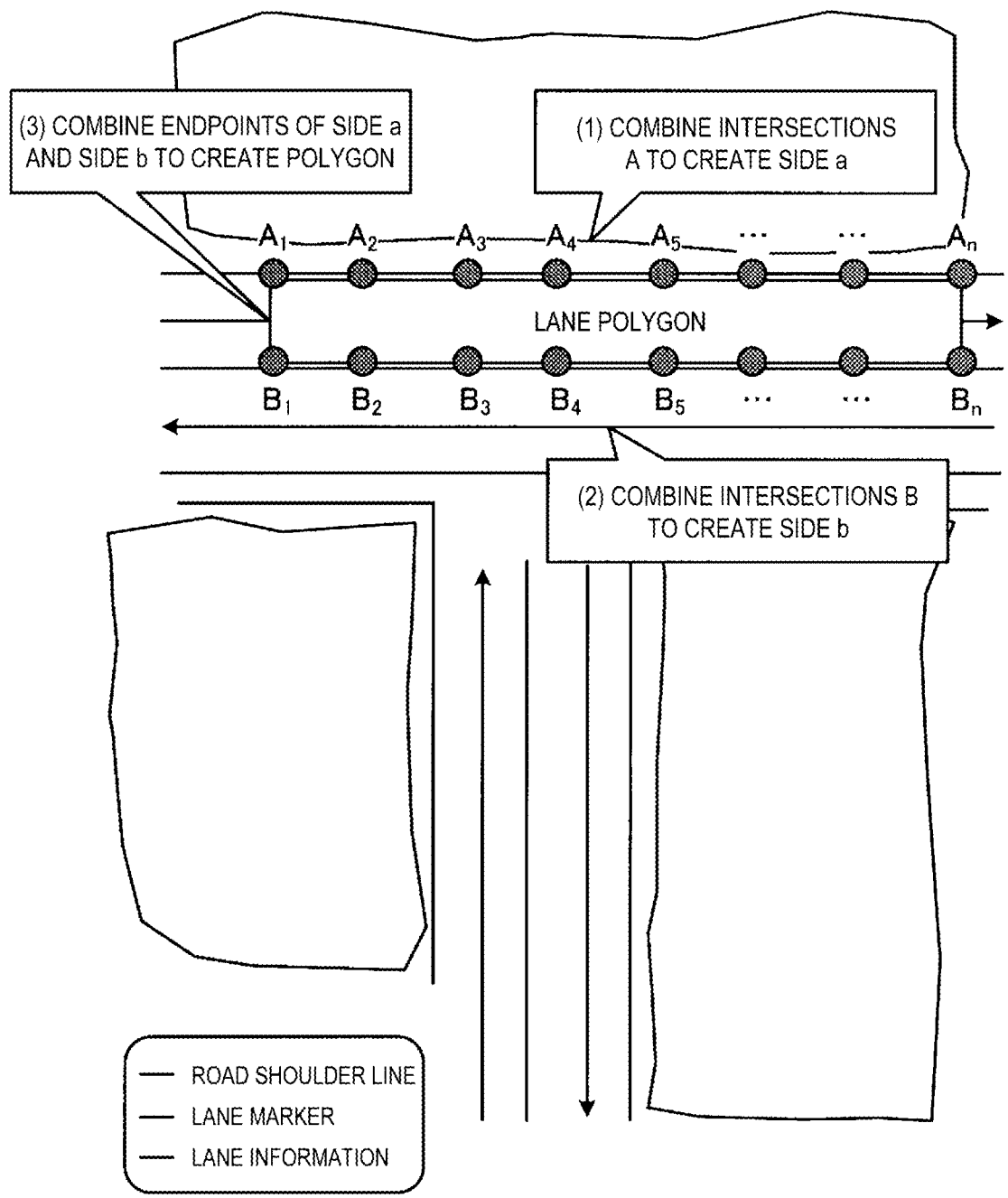
FIG. 27 is a diagram illustrating a flow of the processing executed by the road coordinate conversion device illustrated in FIG. 21.

Next, as illustrated as an example in FIG. 26, the lane polygon generation unit 52 stores the intersections A and B on the lane marker or the road shoulder line first crossed by each vertical bisector, and adds a label. Note that the lane polygon generation unit 52 stores no intersection, if another lane information is first crossed.

Figure 25:
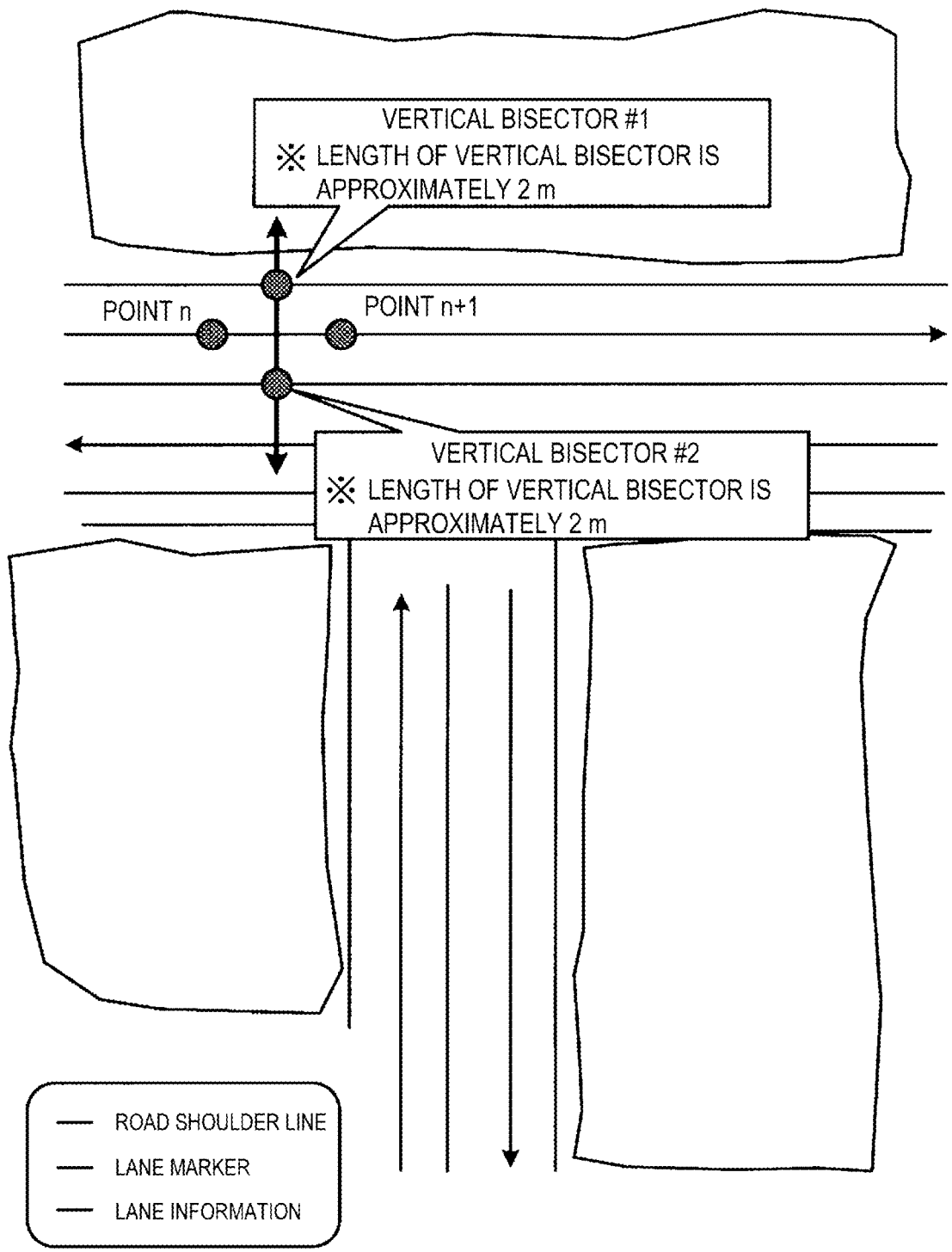
FIG. 25 is a diagram illustrating a flow of the processing executed by the road coordinate conversion device illustrated in FIG. 21.

Then, the lane polygon generation unit 52 repeatedly executes the processing illustrated in FIGS. 25 and 26, with the starting point of the vertical bisector moved by a predetermined distance each time the processing is executed. As a result, the labeled points are set on the lane marker to be separated from one another by a predetermined distance.

Then, the lane polygon generation unit 52 combines points provided with the same label and with the same label plus 1, and generates a lane polygon. For example, as illustrated as an example in FIG. 27, the lane polygon generation unit 52 combines the intersections A to create a side a (see (1) in FIG. 27), combines the intersections B to create a side b (see (2) in FIG. 27), and combines the endpoints of the side a and the side b to create a lane polygon (see (3) in FIG. 27).

In this manner, the lane polygon generation unit 52 generates a plurality of lane polygons from the longitude/latitude data on the lane information, the longitude/latitude data on the road shoulder lines and the lane markers in the road map data.

Processing Procedure of Road Coordinate Conversion Processing

Figure 28:
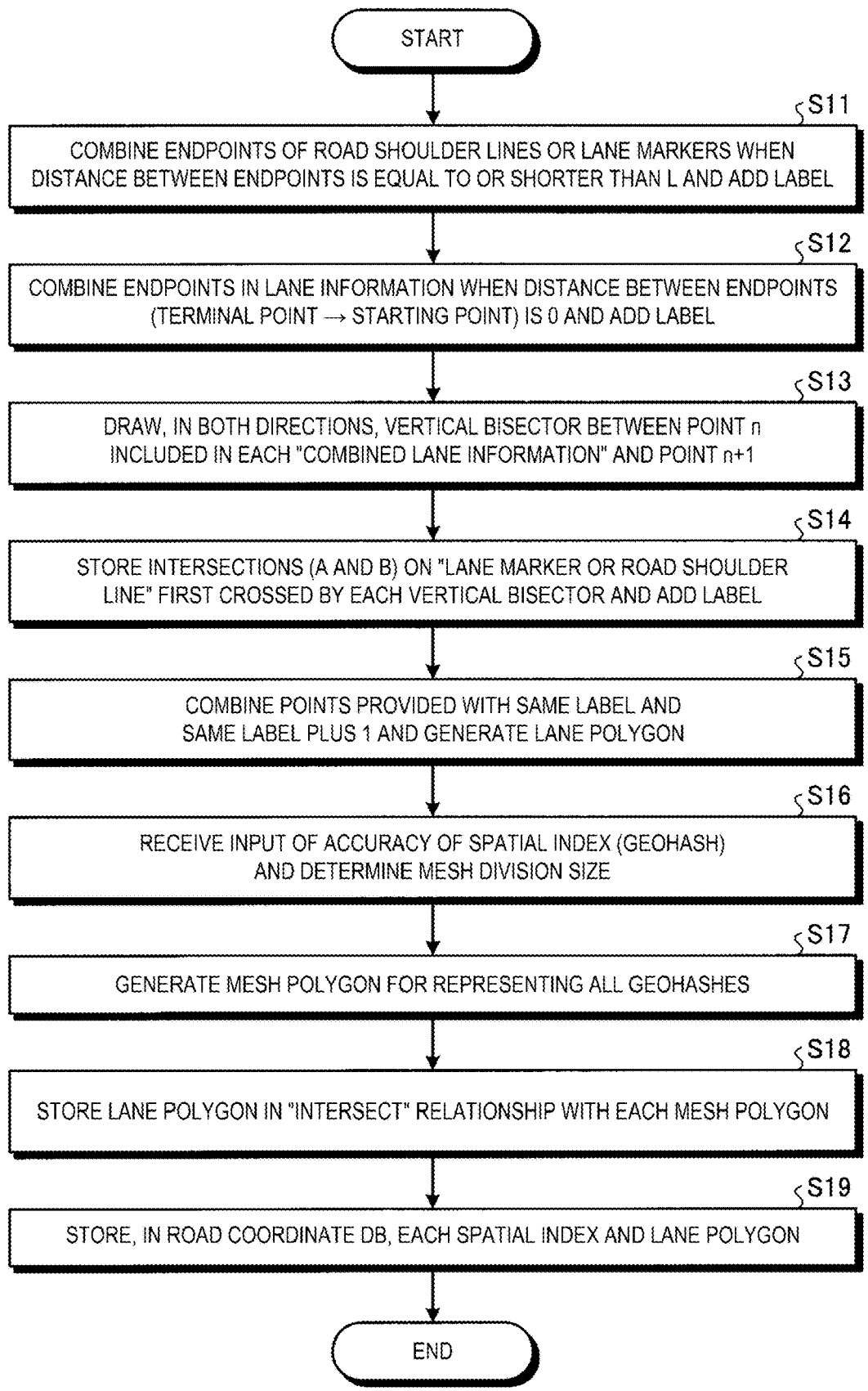
FIG. 28 is a flowchart illustrating a processing procedure for road coordinate conversion processing according to the second embodiment.

FIG. 28 is a flowchart illustrating a processing procedure for road coordinate conversion processing according to the present embodiment.

As illustrated in FIG. 28, the road coordinate conversion device 50A receives an input of the road map data 40, and executes processing of generating a lane polygon. First, the lane polygon generation unit 52 refers to the road map data 40, and executes processing of combining the endpoints of two adjacent lane markers or the endpoints of the two adjacent lane markers when the distance between the endpoints of the two road shoulder lines or the distance between the endpoints of the two lane markers is equal to or shorter than L, and adding a label to the resultant road shoulder line or lane marker (step S11).

Next, the lane polygon generation unit 52 combines the endpoints in the lane information when the distance between the endpoints is 0, and adds a label (step S12). The lane polygon generation unit 52 draws, in both directions, a vertical bisector for a section between a point n included in the combined lane information and a point n+1 adjacent to the point n (step S13).

Next, the lane polygon generation unit 52 stores the intersections A and B on the lane marker or the road shoulder line first crossed by each vertical bisector, and adds a label (step S14). Then, the lane polygon generation unit 52 combines points provided with the same label and with the same label plus 1, and generates a lane polygon (step S15).

Next, upon receiving an input of the accuracy (number of digits) of the spatial index (geohash), the mesh polygon generation unit 53 determines the mesh division size in accordance with the input accuracy (step S16). The mesh polygon generation unit 53 then generates a mesh polygon for representing all geohashes in accordance with the determined mesh division (step S17). The mesh polygon generation unit 53 stores a lane polygon in an "Intersect" relationship with each mesh polygon (step S18).

Then, the storage unit 54 stores, in the road coordinate DB 30, each spatial index and a lane polygon corresponding to each spatial index (step S19), and the road coordinate conversion device 50A terminates the road coordinate conversion processing.

Effects of Second Embodiment

The road coordinate conversion device 50A according to the second embodiment also enables high speed search. Furthermore, the road coordinate conversion device 50A refers to the road map data including the longitude/latitude data on the lane information indicating the center line of the lane, longitude/latitude data on the road shoulder lines, and the longitude/latitude data on the lane markers, and generates a lane polygon indicating the lane region based on the intersections on the lane marker or the road shoulder line crossed by the vertical line in the lane information. Thus, a lane polygon with the width information on the road accurately defined can be generated.

Figure 29:
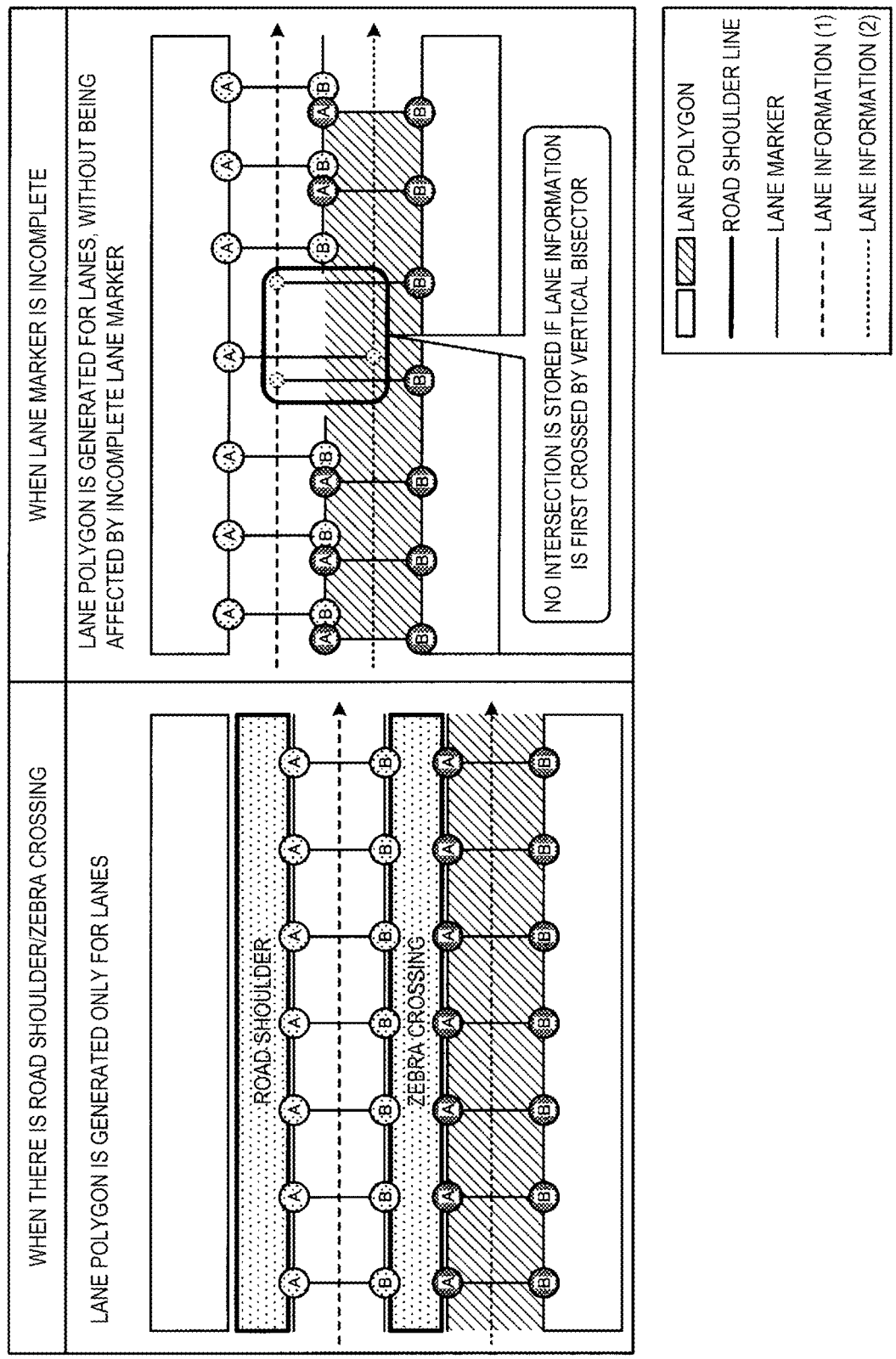
FIG. 29 is a diagram illustrating an example of a lane polygon capable of being generated by the road coordinate conversion device.
Figure 30:
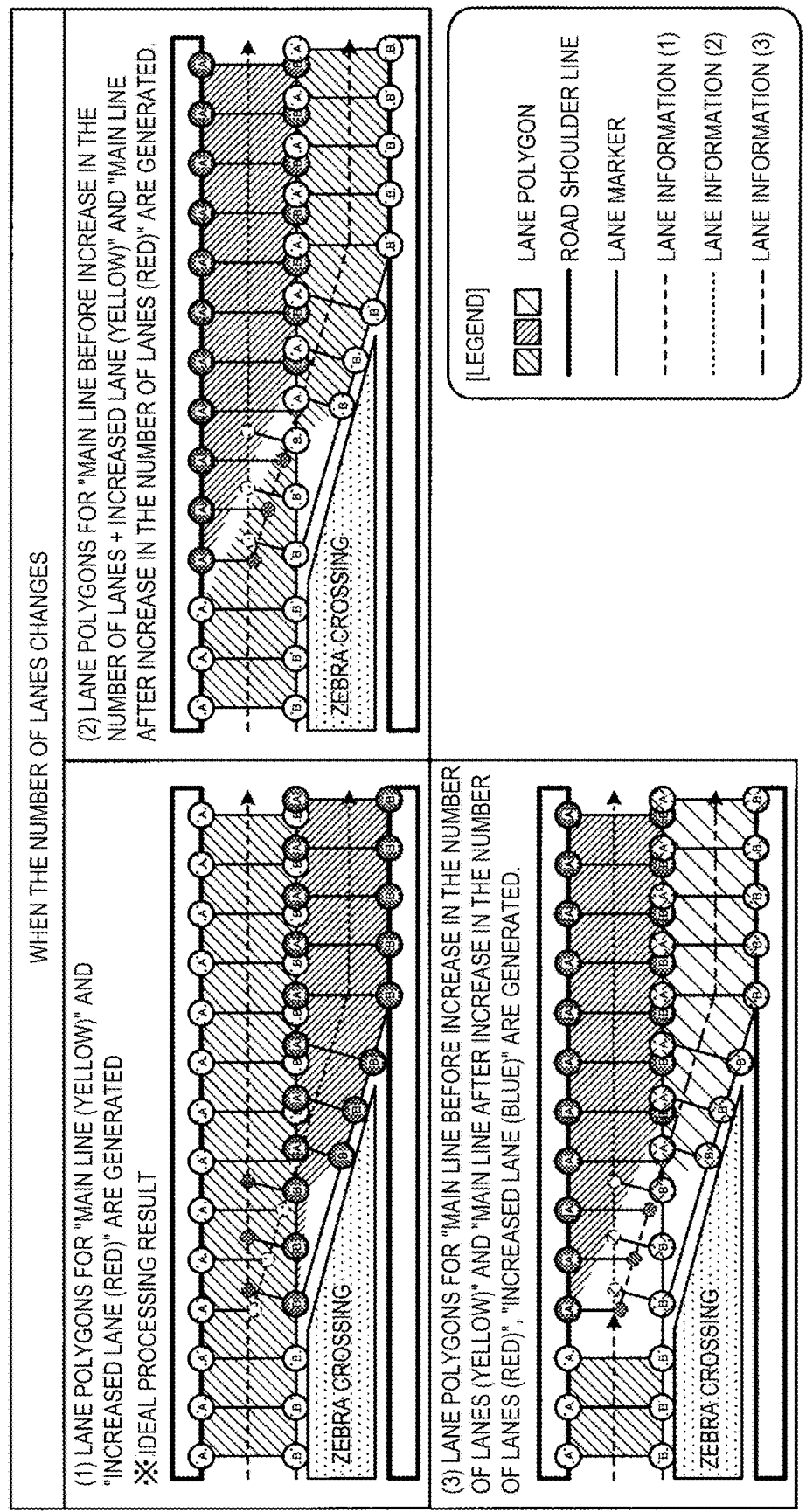
FIG. 30 is a diagram illustrating an example of a lane polygon capable of being generated by the road coordinate conversion device.

FIG. 29 and FIG. 30 are diagrams illustrating an example of a lane polygon capable of being generated by the road coordinate conversion device 50A. As illustrated in FIG. 29, even when there is a road shoulder or a zebra crossing, the road coordinate conversion device 50A does not generate a lane polygon for the road shoulder or the zebra crossing, and generates a lane polygon only for lanes, because there is not lane information on the road shoulder or the zebra crossing. Also, as illustrated in FIG. 29, even when the lane marker is incomplete, the road coordinate conversion device 50A can generate a lane polygon for a lane, without being affected by the incomplete lane marker.

Furthermore, for example, when there are three or more pieces of lane information to be combined, the road coordinate conversion device 50A combines none of them. Thus, even when the number of lanes changes, lane polygons can be generated for "a main line before the increase in the number of lanes", "a main line after the increase in the number of lanes", and "increased lane". Specifically, in a hypothetical case where three or more pieces of lane information are to be combined, a lane polygon is generated for the "main line" and the "increased lane" as illustrated as an example in (1) in FIG. 30, or is generated for the "main line before the increase in the number of lanes+the increased lane" and the "main line after the increase in the number of lanes" as an example in (2) in FIG. 30. The processing results in (1) in FIG. 30 is an ideal result, but there is no material for the determination to achieve such a result. Thus, when there are three or more pieces of lane information to be combined, the road coordinate conversion device 50A combines none of them. Thus, even when the number of lanes changes, as illustrated in (3) in FIG. 30, lane polygons can be generated for "a main line before the increase in the number of lanes", "a main line after the increase in the number of lanes", and "increased lane".

The road coordinate conversion device 50A generates a mesh polygon representing a spatial index, and stores, in the road coordinate DB 30, the data on the mesh polygon and the data on the lane polygon corresponding to the mesh polygon in association with each other. Thus, the road coordinate DB 30 can output, to the spatiotemporal analysis application 10, the road coordinate search result D1 including a lane polygon that accurately represents the lane region.

The road coordinate conversion device 50A combines endpoints of the two adjacent road shoulder lines when the distance between the endpoints of the two road shoulder lines is equal to or shorter than L, and combines endpoints of two adjacent lane markers when the distance between the endpoints of the two lane markers is equal to or shorter than L. The road coordinate conversion device 50 combines incomplete road shoulder lines and lane markers in the road map data 40 to correct the road shoulder lines and the lane markers, and thus can appropriately set non-road regions and the lane markers, whereby the lane polygon can be generated with higher accuracy.

System Configuration in Embodiment

The components of the road coordinate conversion devices 50 and 50A are functional conceptual components and do not necessarily need to be physically configured as illustrated in the drawings. That is, the specific form of distribution and integration of the functions of the road coordinate conversion device 50 is not limited to the illustrated form, and the entirety or a portion of the form can be configured by being functionally or physically distributed and integrated in any unit, depending on various loads, usage conditions, and the like.

All or some types of processing performed by the road coordinate conversion devices 50 and 50A may be implemented by a CPU and a program that is analyzed and executed by the CPU. The processing performed by the road coordinate conversion devices 50 and 50A may be implemented as hardware based on a wired logic.

Further, all or some of the processing operations described as being automatically performed among the processing operations described in the embodiments may be manually performed. Alternatively, all or some of the processing operations described as being manually performed can be automatically performed using a publicly known method. In addition, the processing procedures, control procedures, specific names, and information including various types of data and parameters described and illustrated above can be appropriately changed unless otherwise specified.

Program

Figure 31:
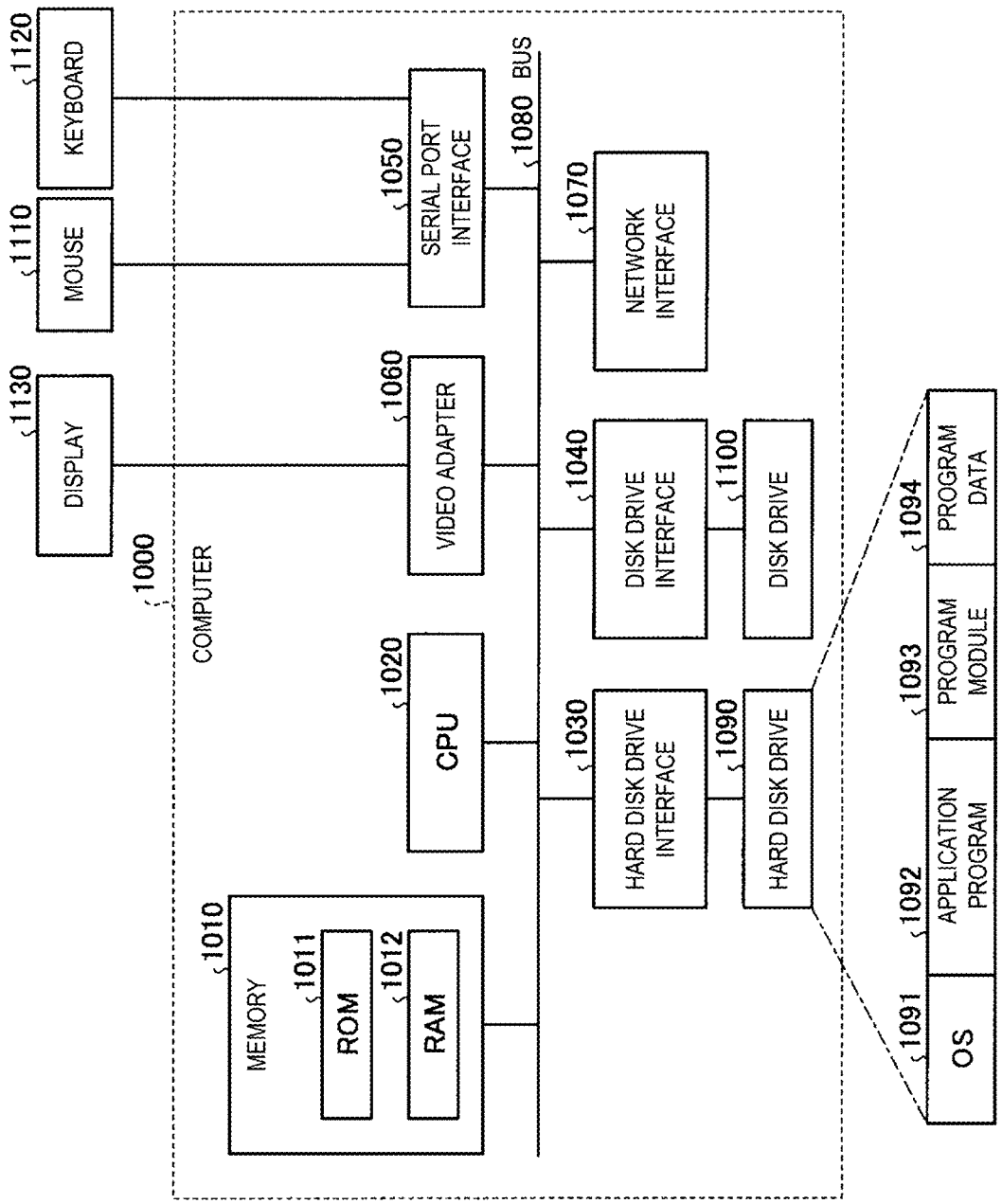
FIG. 31 is a diagram illustrating an example of a computer that executes a program to implement the road coordinate conversion device.

FIG. 31 is a diagram illustrating an exemplary computer that executes a program to implement the road coordinate conversion devices 50 and 50A. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These units are connected by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A removable storage medium such as a magnetic disk or optical disk, for example, is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program defining each processing of the road coordinate conversion devices 50 and 50A is implemented as the program module 1093 in which a code executable by the computer 1000 is described. The program module 1093 is stored in, for example, the hard disk drive 1090. For example, the program module 1093 for executing the same processing as that performed by the functional configurations in the road coordinate conversion devices 50 and 50A is stored in the hard disk drive 1090. Further, the hard disk drive 1090 may be replaced with a solid state drive (SSD).

Further, configuration data to be used in the processing of the embodiments described above is stored as the program data 1094 in, for example, the memory 1010 or the hard disk drive 1090. In addition, the CPU 1020 reads out and executes the program module 1093 or the program data 1094 stored in the memory 1010 or the hard disk drive 1090, as necessary, in the RAM 1012.

The program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in other computers connected via a network (a Local Area Network (LAN), a Wide Area Network (WAN), or the like). In addition, the program module 1093 and the program data 1094 may be read by the CPU 1020 from another computer through the network interface 1070.

Although the embodiments to which the invention made by the present inventor is applied have been described above, the present invention is not limited by the description and the drawings which constitute a part of the disclosure of the present invention according to the embodiments. That is, other embodiments, examples, operation technologies, and the like made by those skilled in the art based on the embodiments are all included in the scope of the present invention.

REFERENCE SIGNS LIST

100 Communication system
10 Spatiotemporal analysis application
20, 20A Road coordinate management system
30 Road coordinate database (DB)
40 Road map data
50, 50A Road coordinate conversion device
51 Reception unit
52 Lane polygon generation unit
53 Mesh polygon generation unit
54 Storage unit
60 Spatiotemporal DB
70 PIP processing module

The invention claimed is:

1. A management device comprising:
processing circuitry configured to:
receive a plurality of inputs of road map data;
refer to the road map data and generate a first polygon representing a lane region;
generate, for a spatial mesh divided into a predetermined size, a second polygon representing a spatial index; and
determine in which spatial mesh of a plurality of spatial meshes the first polygon exists, and in accordance with a result of the determination, store data on the first polygon and data on the second polygon in a road coordinate database in association with each other,
wherein the predetermined size into which the spatial mesh is divided is determined based on an accuracy of the plurality of inputs of the road map data received, and
the accuracy of the plurality of inputs of the road map data received is given in digits of longitude and latitude,
wherein the processing circuitry is further configured to
receive, as the road map data, a plurality of inputs of longitude and latitude data on lane information indicating a center line of a lane, longitude and latitude data on a road shoulder line, and longitude and latitude data on a lane marker, and
refer to the road map data, and generate the first polygon based on an intersection of a vertical line from the lane information and the lane marker or the road shoulder line that intersects the vertical line.

2. The management device according to claim 1, wherein the processing circuitry is further configured to
receive, as the road map data, a plurality of inputs of longitude and latitude data on a road shoulder line and longitude and latitude data on a lane marker, and
refer to the road map data, set a region surrounded by the road shoulder line to be a non-road region, and generate the first polygon using data on two adjacent non-road regions and on a plurality of lane markers positioned between the two adjacent non-road regions.

3. The management device according to claim 2, wherein the road shoulder line and the lane marker are detectable by an in-vehicle sensor.

4. The management device according to claim 3, wherein the in-vehicle sensor is a LIDAR sensor.

5. The management device according to claim 2, wherein the road shoulder line is a white line.

6. The management device according to claim 2, wherein the processing circuitry is further configured to determine that a section between two lane markers is a lane when a distance between the two lane markers is greater than a predetermined distance.

7. The management device according to claim 6, wherein the processing circuitry is further configured to combine endpoints of the two lane markers when the distance between the two lane markers is less than the predetermined distance.

8. The management device according to claim 1, wherein the processing circuitry is further configured to search, about each spatial mesh, for the first polygon included in each of the plurality of spatial meshes, and store, in the road coordinate database, the searched first polygon and the second polygon corresponding to the spatial mesh including the first polygon in association with each other.

9. The management device according to claim 1, wherein the plurality of spatial meshes are non-overlapping.

10. A management method executed by a management device, the management method comprising:
receiving a plurality of inputs of road map data;
referring to the road map data and generating a first polygon representing a lane region;
generating, for a spatial mesh divided into a predetermined size, a second polygon representing a spatial index; and
determining in which spatial mesh of a plurality of spatial meshes the first polygon exists, and in accordance with a result of the determining, storing data on the first polygon and data on the second polygon in a road coordinate database in association with each other,
wherein the predetermined size into which the spatial mesh is divided is determined based on an accuracy of the plurality of inputs of the road map data received, and
the accuracy of the plurality of inputs of the road map data received is given in digits of longitude and latitude,
wherein the method further includes:
receiving, as the road map data, a plurality of inputs of longitude and latitude data on lane information indicating a center line of a lane, longitude and latitude data on a road shoulder line, and longitude and latitude data on a lane marker, and
referring to the road map data, and generate the first polygon based on an intersection of a vertical line from the lane information and the lane marker or the road shoulder line that intersects the vertical line.

11. A non-transitory computer-readable recording medium storing therein a management program that causes a computer to execute a process comprising:
receiving a plurality of inputs of road map data;
referring to the road map data and generating a first polygon representing a lane region;
generating, for a spatial mesh divided into a predetermined size, a second polygon representing a spatial index; and
determining in which spatial mesh of a plurality of spatial meshes the first polygon exists, and in accordance with a result of the determining, storing data on the first polygon and data on the second polygon in a road coordinate database in association with each other,
wherein the predetermined size into which the spatial mesh is divided is determined based on an accuracy of the plurality of inputs of the road map data received, and
the accuracy of the plurality of inputs of the road map data received is given in digits of longitude and latitude,
wherein the process further includes:
receiving, as the road map data, a plurality of inputs of longitude and latitude data on lane information indicating a center line of a lane, longitude and latitude data on a road shoulder line, and longitude and latitude data on a lane marker, and
referring to the road map data, and generate the first polygon based on an intersection of a vertical line from the lane information and the lane marker or the road shoulder line that intersects the vertical line.

* * * * *